(12) United States Patent
Kunieda

(10) Patent No.: US 8,743,227 B2
(45) Date of Patent: Jun. 3, 2014

(54) IMAGING APPARATUS AND CONTROL METHOD FOR REDUCING A LOAD OF WRITING IMAGE DATA ON A RECORDING MEDIUM

(75) Inventor: Shutaro Kunieda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1226 days.

(21) Appl. No.: 12/113,673

(22) Filed: May 1, 2008

(65) Prior Publication Data

US 2008/0273094 A1 Nov. 6, 2008

(30) Foreign Application Priority Data

May 2, 2007 (JP) .................................. 2007-121743
Mar. 4, 2008 (JP) .................................. 2008-053415

(51) Int. Cl.
*H04N 5/225* (2006.01)

(52) U.S. Cl.
USPC .................. 348/220.1; 348/231.2; 348/231.3; 348/231.4; 348/231.6; 348/349

(58) Field of Classification Search
USPC ...................... 348/220.1, 231.2–4, 231.6, 349
See application file for complete search history.

(56) References Cited

U.S. PATENT DOCUMENTS

| | | | | |
|---|---|---|---|---|
| 4,714,963 A * | 12/1987 | Vogel | ........................... | 348/220.1 |
| 6,359,649 B1 * | 3/2002 | Suzuki | ........................ | 348/220.1 |
| 7,110,025 B1 * | 9/2006 | Loui et al. | .................. | 348/220.1 |
| 2002/0196348 A1 * | 12/2002 | Kubo | .......................... | 348/220.1 |
| 2003/0133169 A1 * | 7/2003 | Uchibayashi et al. | ... | 358/426.07 |
| 2004/0109067 A1 * | 6/2004 | Yokoi | .......................... | 348/220.1 |
| 2005/0180510 A1 * | 8/2005 | Togita | ....................... | 375/240.26 |
| 2006/0256203 A1 * | 11/2006 | Honma | ....................... | 348/220.1 |
| 2007/0103561 A1 * | 5/2007 | Kunieda | ..................... | 348/220.1 |
| 2007/0188622 A1 * | 8/2007 | Yagi | ........................... | 348/220.1 |
| 2009/0309988 A1 * | 12/2009 | Kubo et al. | ............... | 348/220.1 |

FOREIGN PATENT DOCUMENTS

| | | |
|---|---|---|
| JP | 2002-010263 A | 1/2002 |
| JP | 2002-077815 A | 3/2002 |
| JP | 2003-8948 A | 1/2003 |
| JP | 2004-064210 A | 2/2004 |
| JP | 2004-104193 A | 4/2004 |
| JP | 2004-201282 A | 7/2004 |
| JP | 2006-345485 A | 12/2006 |
| WO | 2006/028172 A | 3/2006 |

* cited by examiner

*Primary Examiner* — Antoinette Spinks
(74) *Attorney, Agent, or Firm* — Canon U.S.A., Inc. IP Division

(57) ABSTRACT

In response to an input instruction to start a still image capturing operation when a moving image capturing operation is being performed, an imaging apparatus controls the still image capturing operation to record a still image file on a recording medium, interrupts the moving image capturing operation, generates a moving image in which an interframe-compressed image whose difference information is zero is inserted as at least one of images to be substituted for a moving image corresponding to a time period for which the moving image capturing operation is interrupted, and records the generated moving image on the recording medium.

13 Claims, 11 Drawing Sheets

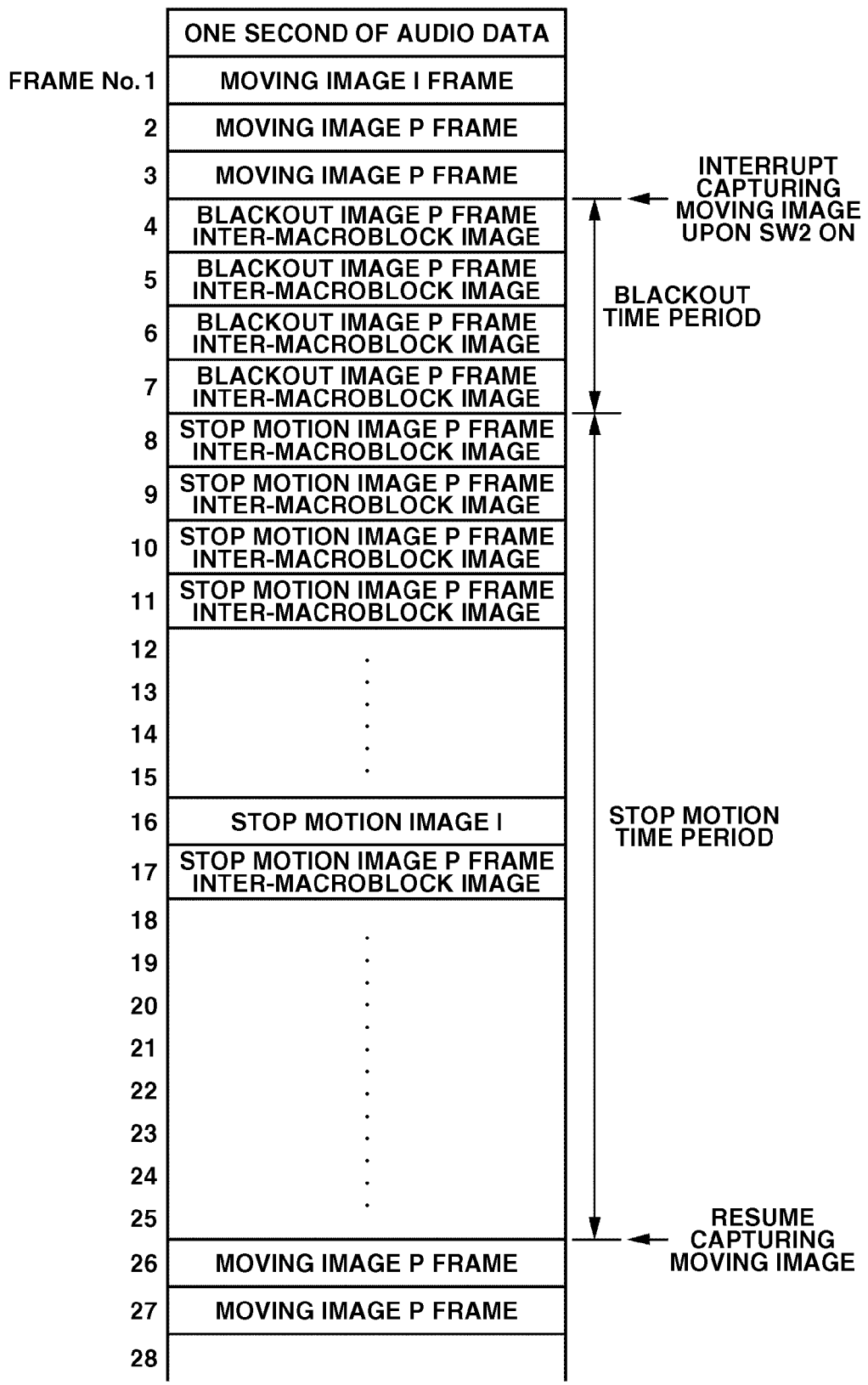

IMAGING APPARATUS AND CONTROL METHOD FOR REDUCING A LOAD OF WRITING IMAGE DATA ON A RECORDING MEDIUM

BACKGROUND OF THE INVENTION

1. Field of the Invention

The present invention relates to an imaging apparatus and a control method therefor. More specifically, the present invention relates to an imaging apparatus configured to record image data captured with an imaging unit on a recording medium and a control method therefor.

2. Description of the Related Art

A conventional digital camera converts an image signal of an image captured with an image sensor, such as a charge-coupled device (CCD), into a digital signal, processes the digital signal into a digital video signal including a luminance signal and color-difference signals, then compresses the digital video signal into Joint Photographic Experts Group (JPEG)-coded image data, and records the compressed image data on a recording medium. In recent years, a conventional image sensor in a digital camera has a high resolution of 10,000,000 pixels or more.

Meanwhile, a conventional digital camera, in reading an image signal, can skip reading some of horizontal lines and vertical lines of its image sensor to read image signals and record the read image signals as a moving image at a high speed. Furthermore, in recent years, a conventional digital camera has two image capturing modes, namely, a still image capturing mode and a moving image capturing mode. A user can switch between the two image capturing modes.

In recent years, as discussed in Japanese Patent Application Laid-Open No. 2004-201282, a still image can be captured while a moving image is being recorded. The method discussed in Japanese Patent Application Laid-Open No. 2004-201282 reduces an occurrence of a phenomenon such that in the case of capturing a still image while recording a moving image, a compressed moving image data file generated based on image data captured in a moving image capturing mode, which has been interrupted to start capturing a still image, may be divided into two files across a still image file. More specifically, the method discussed in Japanese Patent Application Laid-Open No. 2004-201282 reduces a phenomenon of divided moving image data files by using one frame of the moving image data located immediately before a still image capturing time period as a substitute frame and consecutively storing the same substitute frame in the moving image data file for a period as long as the time period in which a still image is captured.

Furthermore, Japanese Patent Application Laid-Open No. 2004-201282 discusses a method for synchronizing a timing of resuming moving image capturing processing by an imaging unit once interrupted to start capturing a still image with a period of capturing a moving image frame in the moving image capturing processing performed before being interrupted. Additionally, Japanese Patent Application Laid-Open No. 2003-8948 discusses a method of using special image data or a solid image as a substitute frame to be substituted for a missing moving image frame.

However, in the above-described conventional methods, the file size of a moving image data file may become large because the methods make a copy of a black image (blackout image) or a substitute frame (stop motion image) and insert the black image or the substitute frame into a moving image data file.

Furthermore, in the above-described conventional methods, when the same stop motion image is input in an image codec, the quality of a reference image may become lower than an input image. Thus, a compression ratio may not be as high as expected.

SUMMARY OF THE INVENTION

The present invention is directed to an imaging apparatus capable of reducing the size of moving image data inserted during interruption of moving image recording processing, which is interrupted to start capturing a still image, and thus reducing a load of writing image data on a recording medium.

According to an aspect of the present invention, an imaging apparatus configured to record image data captured by an imaging unit on a recording medium includes a moving image capturing control unit configured to control a moving image capturing operation for recording on the recording medium a moving image obtained by a continuous image capturing operation by the imaging unit, and a still image capturing control unit configured to control a still image capturing operation for recording on the recording medium a still image obtained by an image capturing operation by the imaging unit as a still image file. In response to an input instruction to start the still image capturing operation when the moving image capturing operation is being performed, the still image capturing control unit controls the still image capturing operation to record the still image file on the recording medium, and the moving image capturing control unit interrupts the moving image capturing operation, generates a moving image in which an interframe-compressed image whose difference information is zero is inserted as at least one of images to be substituted for a moving image corresponding to a time period for which the moving image capturing operation is interrupted, and records the generated moving image on the recording medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 11 illustrates an example of a data structure of a moving image file in the case where a still image capturing operation is performed during a moving image recording operation according to the fourth exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
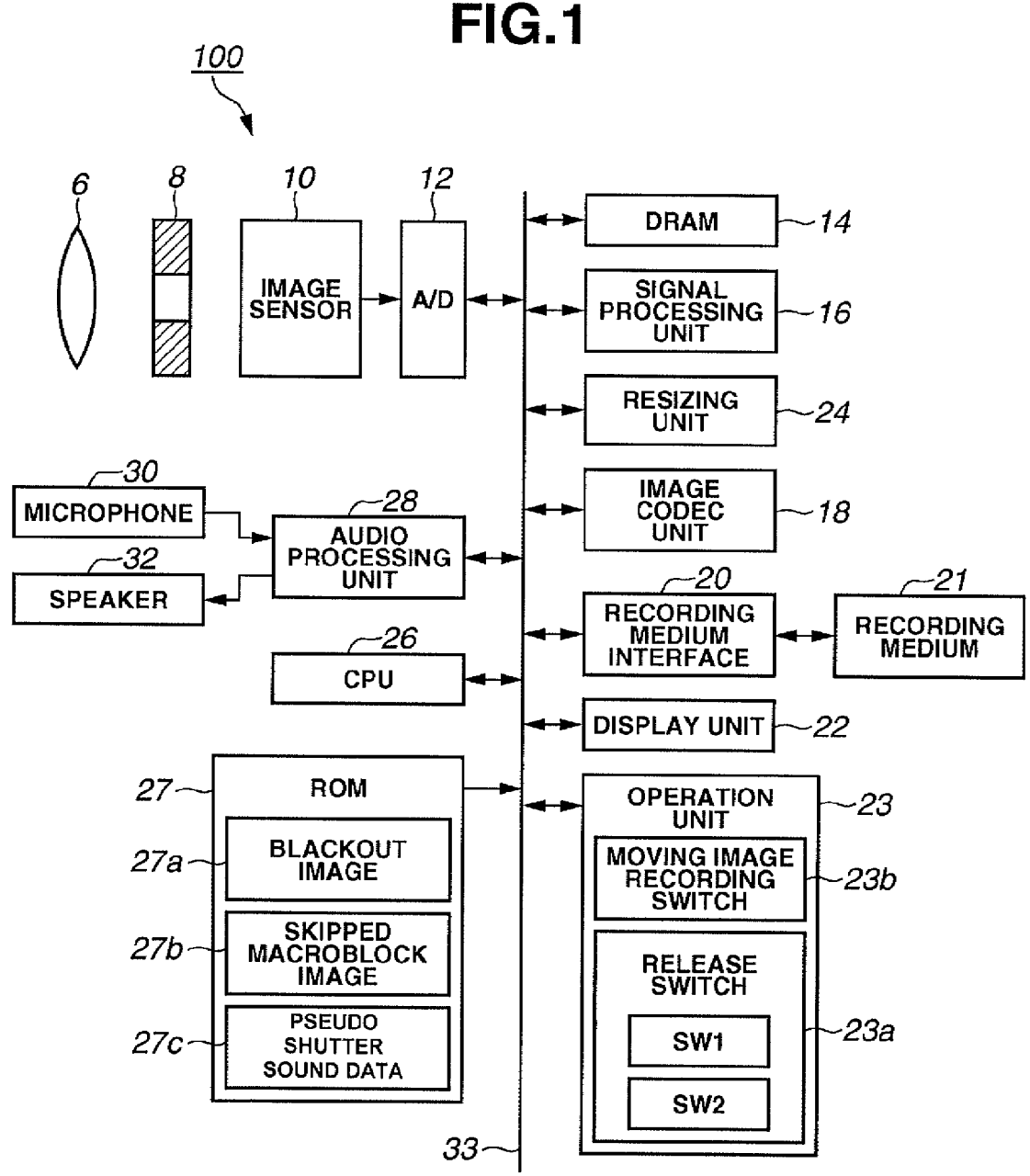
FIG. 1 illustrates an example of a configuration of a digital camera according to an exemplary embodiment of the present invention.

A first exemplary embodiment of the present invention will be described below. FIG. 1 illustrates an example of a configuration of a digital camera 100, serving as an imaging apparatus, according to an exemplary embodiment.

Referring to FIG. 1, a photographic lens 6 includes one or more lens elements. An exposure control unit 8 includes a diaphragm and a shutter and adjusts a level of exposure according to a luminance level of an object. An image sensor 10, serving as an imaging unit, includes a charge-coupled device (CCD) sensor or a complementary metal-oxide semiconductor (CMOS) sensor and has a resolution of several million pixels. The image sensor 10 outputs an analog image signal for each color component, which is obtained by capturing an image.

An analog-to-digital (A/D) converter 12 converts an analog signal from the image sensor 10 into a digital signal. A dynamic random access memory (DRAM) 14 temporarily stores a digital image signal from the A/D converter 12 and temporarily buffers signal-processed image data or compressed image data (the processing will be described in detail later below). A memory controller (not illustrated) is provided to write and read data on and from the DRAM 14.

A signal processing unit 16 converts the digital image signal obtained by the A/D converter 12 into a luminance signal and color-difference signals to generate YUV data. An image codec unit 18 compresses the YUV data from the signal processing unit 16 into JPEG or Moving Picture Experts Group (MPEG) image data or decompresses JPEG or MPEG-compressed image data into YUV data.

A recording medium interface 20 writes and reads compressed image data on and from a CompactFlash (CF) card or a Secure Digital (SD) card. A recording medium 21 includes a removable recording medium, such as a CF card or an SD card. Any recording medium that can be random-accessed can be used as the recording medium 21. For example, an optical disc, such as a digital versatile disc (DVD), or a hard disk can be used as the recording medium 21.

A display unit 22 includes a color liquid crystal display (LCD). The display unit 22 can be used to perform viewer display or review display based on a captured image and to reproduce and display a decompressed image. The display unit 22 includes an output terminal for outputting a video signal to an external display apparatus, such as a television set.

A resizing unit 24 resizes the size of the YUV data output from the signal processing unit 16 into an arbitrarily determined size. A central processing unit (CPU) 26 controls each processing unit described above and a data flow (described in detail later below).

A read-only memory (ROM) 27 stores a program for processing by the CPU 26, various information, and data. More specifically, the ROM 27 stores MPEG-coded blackout image data, skipped macroblock image data, and WAVE data of pseudo shutter sound, which will be described in detail later below. The image sensor 10, the A/D converter 12, the DRAM 14, the signal processing unit 16, the resizing unit 24, the image codec unit 18, the recording medium interface 20, the display unit 22, the CPU 26, and the ROM 27 are in communication with one another via a system bus 33.

Furthermore, a direct memory access (DMA) controller (not illustrated) is provided between each unit and the DRAM 14, which is used for a DMA data transfer without requiring a data transfer using the CPU 26. Moreover, a path (not illustrated) for directly transmitting data is provided between the A/D converter 12 and the signal processing unit 16, between the signal processing unit 16 and the image codec unit 18, and between the signal processing unit 16 and the resizing unit 24, without requiring a data transfer using the CPU 26 or the DMA controller.

An audio processing unit 28 records and reproduces audio data. A microphone 30 can be used to input audio data in recording audio data. A speaker 32 can reproduce the recorded audio data. The audio processing unit 28 performs A/D and digital-to-analog (D/A) conversion processing on audio data and records and reproduces audio data.

An operation unit 23 includes various buttons and dial switches, such as a release switch 23a and a moving image recording switch 23b. The release switch 23a can be operated by a user to generate an instruction for starting capturing a still image. The moving image recording switch 23b can be operated by a user to generate an instruction for starting or interrupting (stopping) moving image recording processing.

Now, a moving image capturing operation according to an exemplary embodiment is described below. In the present exemplary embodiment, the CPU 26 has a moving image capturing control function. That is, the CPU 26 controls each unit in FIG. 1 to perform a moving image recording operation.

A light beam that has passed through the photographing lens 6 reaches the exposure control unit 8, which includes a diaphragm and a shutter. The exposure control unit 8 controls the exposure of the light beam. Then, the light beam reaches the image sensor 10 to form an image. In a moving image capturing mode, the shutter (mechanical component of the exposure control unit 8) opens and the diaphragm of the exposure control unit 8 controls the exposure. The image sensor 10 performs a photoelectric conversion on an object image. The image sensor 10 sends an analog image signal to the A/D converter 12.

The A/D converter 12 converts the received analog image signal into a digital image signal. The A/D converter 12 transfers the digital image signal to the signal processing unit 16 via the system bus 33. In the moving image capturing mode, not all of the pixels are read from the image sensor 10. That is, pixels thinned out in horizontal and vertical directions are read according to a recording frame rate, thus reducing a load on the resizing unit 24. The signal processing unit 16 performs filtering processing in horizontal and vertical directions, aperture correction processing, and gamma correction processing according to the moving image capturing mode. The image signal thus processed is then transferred to the resizing unit 24.

The resizing unit 24 resizes the size of the image signal into Video Graphics Array (VGA)-format size (640 (horizontal)× 480 (vertical) lines) and transfers the resized image signal to the DRAM 14. The VGA image data stored on the DRAM 14 is then transferred to the display unit 22 to be displayed as a through image on an LCD of a television set (not illustrated) or the digital camera 100. In the present exemplary embodiment, a state of the digital camera 100 up to the time when the display processing is performed is referred to as a "moving image capturing preparation state".

When the user presses the moving image recording switch 23b of the operation unit 23 in the moving image capturing preparation state, the CPU 26 controls each unit to start a moving image recording operation.

That is, in parallel with the conversion of the VGA image data on the DRAM 14 into MPEG data with the image codec unit 18, the audio processing unit 28 converts audio data captured via the microphone 30 into WAVE audio data. Then, the CPU 26 adds a header to the MPEG data and the WAVE data to generate an Audio Video Interleaving (AVI) moving image data file. The moving image file thus generated is then recorded on the recording medium 21 via the recording medium interface 20. The moving image recording processing continues until the user presses the moving image recording switch 23b again.

Hereinafter, in the present exemplary embodiment, a state including both the moving image capturing preparation state and the moving image recording state is referred to as a "moving image capturing operation state". The format of recording a moving image file is not limited to the AVI format. That is, MOV format or MPEG format can be used to record moving image data. Furthermore, compressed audio data can be used.

Now, a still image capturing operation according to the present exemplary embodiment is described below. In the present exemplary embodiment, the CPU 26 has a still image capturing control function. That is, the CPU 26 controls each unit in FIG. 1 to perform a still image capturing operation.

In a still image capturing preparation state, processing approximately similar to the processing performed in the above-described moving image capturing preparation state. Thus, a through image of an image captured with the image sensor 10 is displayed on the display unit 22.

The release switch 23a of the operation unit 23 includes a two-stage switch. When the user half-presses the release switch 23a, a switch SW 1 is turned ON. When the user fully presses the release switch 23a, a switch SW 2 is turned ON. When the switch SW1 is ON, the digital camera 100 shifts to an image capturing preparation state. When the switch SW2 is ON, the digital camera 100 sifts to the still image capturing operation state.

More specifically, in the image capturing preparation state where the switch SW1 is ON, the CPU 26 performs auto focusing (AF) processing and autophotometry (autoexposure: AE) processing, which are required to perform a still image capturing operation. When the user presses the switch SW2 and thus the digital camera 100 shifts from the preparation state to the still image capturing operation state, a first-curtain electronic shutter is closed, then reading of an image signal from the image sensor 10 is interrupted, and then the digital camera 100 shifts the mode of the image sensor 10 to an exposure mode. Then, the CPU 26 sets an aperture value according to an exposure setting value that has been calculated based on the luminance level of the object in the image capturing preparation state. Then, the CPU 26 opens and closes the shutter at a shutter speed calculated after removing the residual charge on the image sensor 10.

When the shutter is completely closed, the CPU 26 shifts the mode of the image sensor 10 from the exposure mode to a reading mode. In the reading mode, the CPU 26 reads data of all pixels in a plurality of fields.

The A/D converter 12 converts the signal thus read into a digital signal. Then, the CPU 26 transfers RAW data from the A/D converter 12 to the DRAM 14 via the system bus 33. When the reading from the image sensor 10 is completed, the CPU 26 starts development processing.

In the development processing, the CPU 26 reads the RAW data from the DRAM 14 and transfers the read data to the signal processing unit 16. The signal processing unit 16 performs horizontal/vertical filtering processing, aperture correction processing, and gamma correction processing in the still image capturing mode. After performing the processing, the CPU 26 transfers the thus generated YUV data to the image codec unit 18. The image codec unit 18 converts the received YUV data into JPEG data. Then, the image codec unit 18 writes the JPEG data onto the DRAM 14.

The development processing includes processing from the processing for reading RAW data from the DRAM 14 to the processing for writing JPEG data onto the DRAM 14.

The thus-generated still image data (JPEG data) is written onto the recording medium 21 as a still image file. The YUV data from the signal processing unit 16 being subjected to the development processing is transferred also to the resizing unit 24. The resizing unit 24 resizes the size of the received YUV data into the size as large as the VGA size to display a review image. Then, the CPU 26 writes the resized data onto the DRAM 14. After the development processing is completed, the CPU 26 transfers the VGA-sized YUV data to the display unit 22 to display a review image for confirmation at the time of image capturing. The transferred YUV data is displayed on an LCD of a television set or the digital camera 100 as a review image.

The moving image capturing operation and the still image capturing operation according to the present exemplary embodiment are as described above. Furthermore, the digital camera 100 can capture a still image during a moving image recording operation. That is, the digital camera 100 can perform still image capturing processing and still image recording processing in parallel with the moving image recording processing. Now, the processing for capturing a still image during a moving image recording operation, which is performed by the CPU 26, is described below with reference to a flow chart illustrated in FIG. 2.

Figure 2:
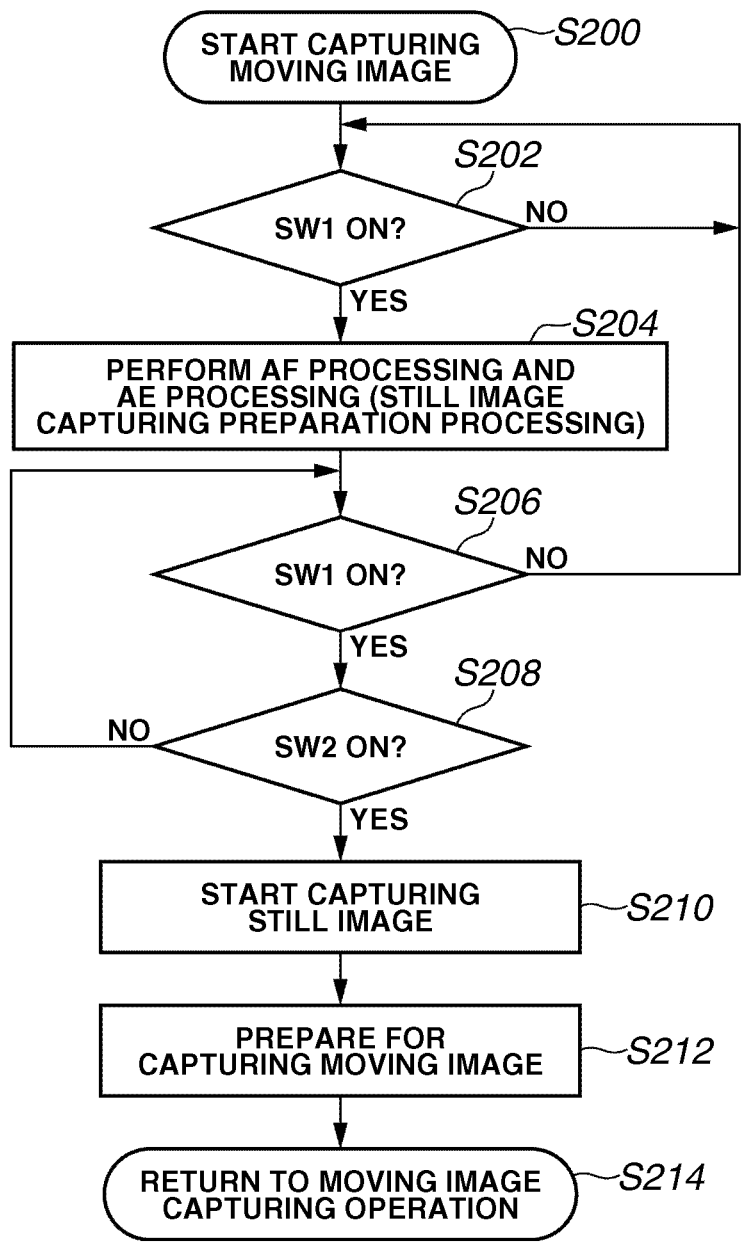
FIG. 2 is a flow chart illustrating an example of processing for capturing a still image performed during a moving image recording operation according to an exemplary embodiment of the present invention.

Referring to FIG. 2, in step S200, the CPU 26 captures a moving image according to the above-described moving image capturing operation and records the captured moving image. That is, in step S200, the user presses the moving image recording switch 23b of the operation unit 23, and the CPU 26, according to the pressing of the moving image recording switch 23b by the user, generates and records an AVI file (moving image) on the recording medium 21.

In step S202, the CPU 26 monitors and determines whether the user has pressed the half-pressing detection switch SW1 of the release switch 23a during recording of the moving image. If it is determined in step S202 that the switch SW1 is OFF (NO in step S202), then the CPU 26 continues the moving image recording operation.

When the user half-presses the release switch 23a and thus the switch SW1 is ON, the processing advances to step S204. In step S204, the CPU 26 performs the still image capturing preparation processing (AF processing and AE processing) in parallel with recording of the moving image.

In step S206, the CPU 26 monitors the switch SW1 to determine whether the user has pressed the switch SW1 (whether the user has half-pressed the release switch 23a). If it is determined in step S206 that the switch SW1 is ON (YES in step S206), then the CPU 26 continues the AF processing and the AE processing. On the other hand, if it is determined in step S206 that the switch SW1 is OFF (NO in step S206), then the CPU 26 ends the still image capturing preparation operation. In this case, the CPU 26 returns to step S202 to continue the moving image recording processing.

When the switch SW1 is ON and the still image capturing preparation processing is completed, the processing advances to step S208. In step S208, the CPU 26 monitors the switch SW2 to determine whether the user has fully pressed the release switch 23a (whether the switch SW2 is ON).

If it is determined in step S208 that the switch SW2 is OFF while the switch SW1 is ON (NO in step S208), then the CPU 26 continues the AF processing and the AE processing. On the other hand, if it is determined in step S208 that the switch SW2 is ON (YES in step S208), then the processing advances to step S210. In step S210, the CPU 26 performs the still image capturing operation.

The still image capturing operation in step S210 is substantially similar to the above-described still image capturing operation. The still image capturing operation in step S210 is different from the above-described still image capturing operation in such a point that, in step S210, the CPU 26 temporarily interrupts recording of the moving image to capture a still image during recording of the moving image. At this time, the CPU 26 switches a driving mode of the image sensor 10. Accordingly, the CPU 26 cannot generate a moving image frame based on the moving image.

In the present exemplary embodiment, a substitute frame and a skipped macroblock image are inserted in substitution for missing moving image frames. Processing for inserting a substitute frame and a skipped macroblock image is described in detail later below with reference to a flow chart for processing for generating a moving image file while capturing a still image illustrated in FIG. 3.

When the still image capturing operation is completed, then in step S212, the CPU 26 performs a preparation operation for the moving image capturing operation, which has been interrupted. In step S214, the CPU 26 returns to step S200 to perform the moving image capturing operation again.

Now, processing for generating a moving image file is described with reference to the flow chart of FIG. 3. The processing in FIG. 3 is performed substantially in parallel with the still image capturing operation.

Figure 3:
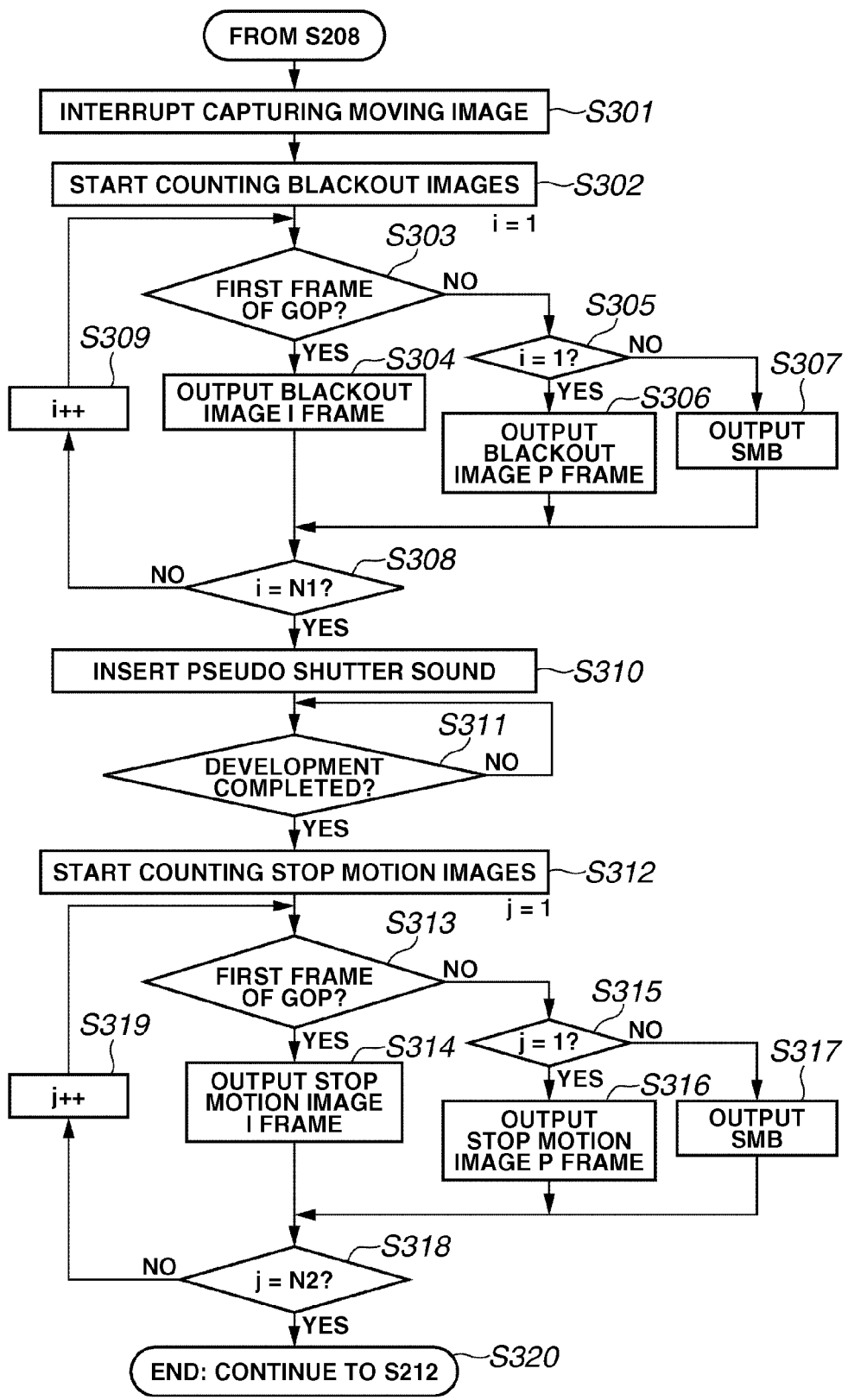
FIG. 3 is a flow chart illustrating an example of processing for generating a moving image file performed when the still image capturing operation is performed according to an exemplary embodiment of the present invention.

Referring to FIG. 3, processing in step S301 starts if it is determined in step S208 that the switch SW2 is ON (YES in step S208). In step S301, the CPU 26 interrupts the moving image capturing operation and starts the processing.

In step S302, the CPU 26 starts counting a number N1 of blackout images, which has previously been set as a value corresponding to a time period for which a moving image capturing operation is interrupted to capture a still image. Here, an initial value i for the number N1 is set at 1.

In step S303, the CPU 26 determines whether the substitute frame is the first frame of a group of picture (GOP), to insert a blackout image and a skipped macroblock image as a first substitute frame in the moving image frame.

If it is determined in step S303 that the substitute frame is the first frame of the GOP (YES in step S303), then the processing advances to step S304. In step S304, the CPU 26 outputs a blackout image I frame that has been encoded by the image codec unit 18.

On the other hand, if it is determined in step S303 that the substitute frame is not the first frame of the GOP (NO in step S303), then the processing advances to step S305. In step S305, the CPU 26 determines whether the value i=1. If it is determined in step S305 that the value i=1 (YES in step S305), then the processing advances to step S306. In step S306, the CPU 26 outputs a blackout image P frame that has been encoded by the image codec unit 18.

If it is determined in step S303 that that the substitute frame is not the first frame of the GOP (NO in step S303) and it is determined in step S305 that i≠1 (NO in step S305), then the processing advances to step S307. In step S307, the CPU 26 outputs a skipped macroblock image (SMB image).

Here, the "I frame" refers to an intra-coded frame, which is a key frame. Furthermore, the "P frame" refers to a predicted frame, which is a difference frame (including a B frame). The "blackout image" is solid black MPEG data. Because the blackout image is an MPEG-compressed solid black image, the data size of the blackout image is very small.

Here, the SMB image is a type of interframe-coded (compressed) image, which includes information about a difference between frames. For example, the SMB image is an image whose motion vector is zero. The data size of the SMB image is very small. That is, for example, the size of the SMB image is approximately several tens of bites if resized to a VGA size. The SMB image referred to here is an SMB image 27b stored on the ROM 27 (FIG. 1). The SMB image 27b is MPEG-coded in the VGA size.

The SMB image 27b is read from the ROM 27 and is then inserted in the moving image file (AVI data) as a first substitute frame.

If a stop motion image (to be described later below) is a P frame, because a blackout image is necessary as a reference frame in this case, the CPU 26 generates a blackout image with the image codec unit 18.

Figure 5:
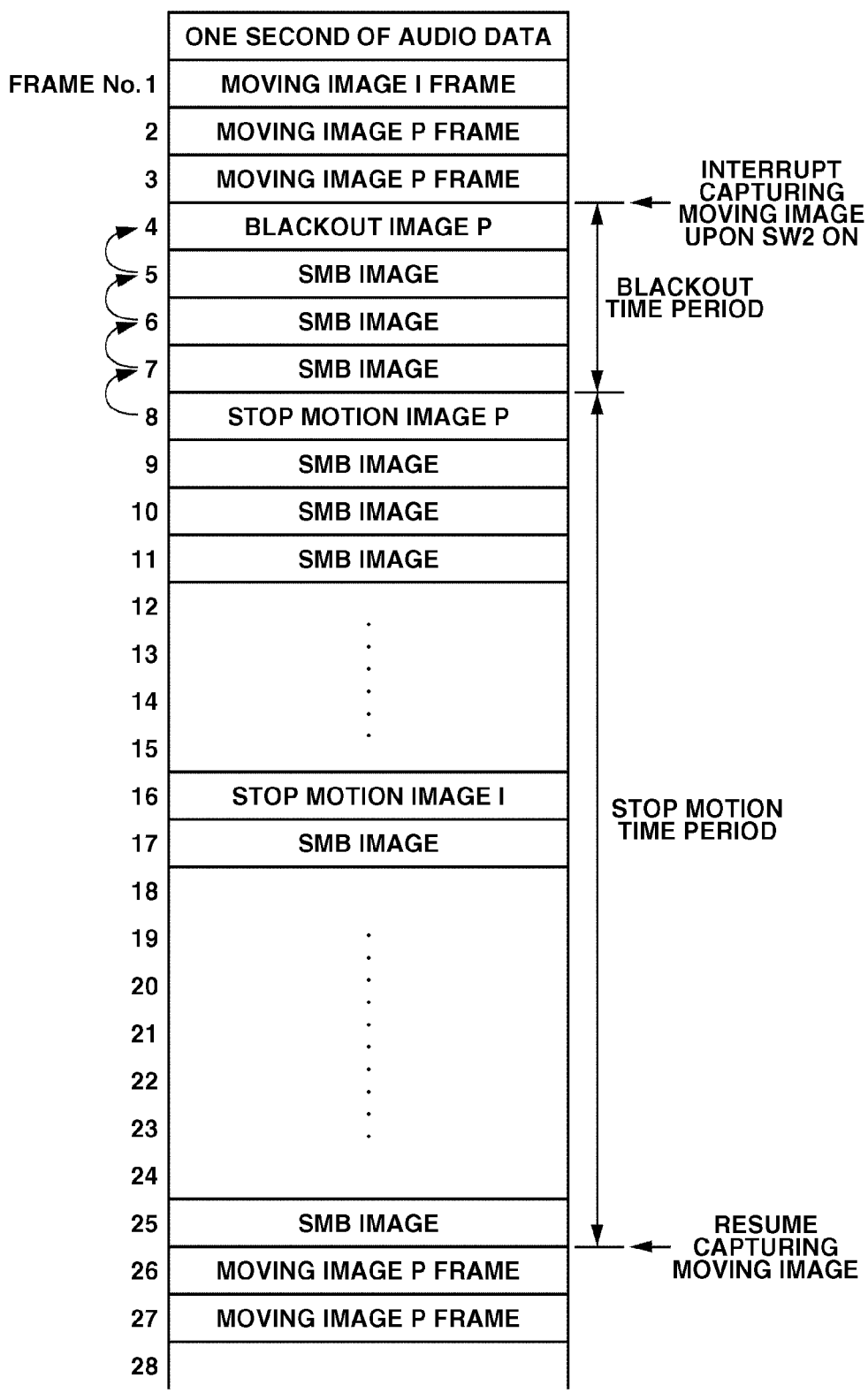
FIG. 5 illustrates an example of a data structure of a moving image file in the case where a still image capturing operation is performed during a moving image recording operation according to a first exemplary embodiment of the present invention.

FIG. 5 illustrates an example of a configuration of a moving image file recorded while capturing a still image during recording of the moving image according to an exemplary embodiment.

Referring to FIG. 5, in generating a stop motion image P frame for a frame No. 8, it is necessary to acquire and use information about a frame No. 7. In the same way, for a frame No. 7, it is necessary to acquire and use information about a frame No. 6. Likewise, for a frame No. 6, it is necessary to acquire and use information about a frame No. 5, and for a frame No. 5, it is necessary to acquire and use information about a frame No. 4.

Accordingly, since it is necessary to acquire and use information about the frame No. 4 in generating a stop motion image P frame for the frame No. 8, the CPU 26 generates a blackout image P frame for the frame No. 4 with the image codec unit 18. Alternatively, the CPU 26 temporarily stores information about the frame No. 4 for generating a stop motion image P frame with the image codec unit 18.

Since the frames No. 5 through No. 7 are SMB images 27b, the CPU 26 generates the frame No. 8 using information about the frame No. 4 instead of using information about the frame No. 7.

In the case where the stop motion image is an I frame, a blackout image is not necessary as a reference frame. Accordingly, in this case, the image codec unit 18 does not generate a blackout image. Furthermore, in this case, the CPU 26 reads an MPEG-coded blackout image 27a (FIG. 1) from the ROM 27 and inserts the read blackout image 27a into the moving image file (AVI data) as a first substitute frame. Alternatively, the CPU 26 can generate the blackout image 27a instead of reading the MPEG-coded blackout image 27a from the ROM 27.

The length (time period) of the first substitute frame is equivalent to a maximum exposure time in a camera green mode (AUTO mode) and is about ⅛ second (125 msec). In the case of capturing a moving image at a speed of 30 frames/sec, the number of frames in ⅛ second is four.

Accordingly, the CPU 26 inserts one blackout image 27a (that has been read from the ROM 27) (or one blackout image generated with the image codec unit 18) and three SMB images 27b into the AVI file. Here, the CPU 26 can insert an image including a message, such as "capturing a still image . . . ", instead of the blackout image.

In step S308, the CPU 26 determines whether the number of blackout images has reached the value N1. If it is determined in step S308 that the number of blackout images has not reached the value N1 (NO in step S308), then the processing advances to step S309. In step S309, the CPU 26 increments the value i and then returns to step S303. On the other hand, if it is determined in step S308 that the number of blackout images has reached the value N1 (YES in step S308), then the processing advances to step S310.

In step S310, the CPU 26 reads pseudo shutter sound data 27c (FIG. 1) from the ROM 27 and inserts the read pseudo shutter sound data 27c into the moving image file (AVI file) as audio data. In addition, in step S310, the CPU 26 outputs the pseudo shutter sound data 27c to the audio processing unit 28 to reproduce the pseudo shutter sound data 27c with the speaker 32. The time length of the pseudo shutter sound data 27c is set substantially similar to the above-described time length of the blackout image data.

At this time, if the audio data recorded via the microphone 30 is suddenly replaced with the pseudo shutter sound data 27c, the sudden replacement of the audio data may lead to generate a high-frequency component, and noise data may be generated due to aliasing.

In this regard, in the time period for substituting the audio data with the pseudo shutter sound data 27c (i.e., in the time period for reproducing the pseudo shutter sound data 27c with the speaker 32), the audio processing unit 28 does not detect audio information (mutes the audio data to be reproduced). Then, the CPU 26 inserts the pseudo shutter sound data 27c on the muted audio data. Thus, high-quality pseudo shutter sound data 27c can be inserted into the audio data without generating a high-frequency noise, which may be generated due to aliasing.

In step S311, the CPU 26 waits until the still image development processing in the above-described still image capturing operation is completed. When the still image development processing is completed, the processing advances to step S312.

After the still image development processing is completed, the CPU 26 JPEG-encodes the developed still image with the image codec unit 18, as processing in step S210 (FIG. 2), and generates one still image file based on the JPEG-coded data. The still image file thus generated is stored on the recording medium 21 separately from the moving image file.

In parallel with the above-described processing or after the above-described processing is completed, in step S312, the CPU 26 generates a review image of VGA size with the resizing unit 24 based on the developed still image. Then, the CPU 26 starts counting a number N2 of stop motion images. Here, an initial counting value j for the number N2 is 1.

In step S313, the CPU 26 determines whether the substitute image (stop motion image) is the first frame of the GOP. If it is determined in step S313 that the substitute image is the first frame of the GOP (YES in step S313), then in step S314, the CPU 26 encodes the review image data with the image codec unit 18 as a stop motion image I frame and outputs the stop motion image I frame.

On the other hand, if it is determined in step S313 that the substitute image is not the first frame of the GOP (NO in step S313), then the processing advances to step S315. In step S315, the CPU 26 determines whether the value j=1. If it is determined in step S315 that the value j=1 (YES in step S315), then the processing advances to step S316. Instep S316, the CPU 26 encodes the review image data with the image codec unit 18 as a stop motion image P frame and outputs the stop motion image P frame.

On the other hand, if it is determined in step S313 that the substitute frame is not the first frame of the GOP (NO in step S313) and it is determined in step S315 that the value j≠1 (NO in step S315), then the processing advances to step S317. In step S317, the CPU 26 outputs an SMB image.

In step S318, the CPU 26 determines whether the value j has reached the number N2 of stop motion images. If it is determined in step S318 that the value j has not reached the number N2 of stop motion images (NO in step S318), then the processing advances to step S319. In step S319, the CPU 26 increments the value j and then returns to step S313. On the other hand, if it is determined in step S318 that the value j has reached the number N2 of stop motion images (YES in step S318), then the processing advances to step S320. In step S320, the processing advances to step S212 (FIG. 2).

The coded image of VGA size (stop motion image) is the second substitute frame data. The CPU 26 interpolates the AVI file with the second substitute frame, continuously to the blackout image (first substitute frame), using the SMB image or the stop motion image by the number equivalent to the number of moving image frames whose recording has been interrupted during the development processing time period. That is, the CPU 26 inserts the second substitute frame into the AVI file an appropriate number of times.

The CPU 26 inserts the audio data, during the time period in which the second substitute frame is inserted, into the AVI file after generating WAVE data based on the audio data input via the microphone 30 with the audio processing unit 28. That is, when the AVI file is reproduced, audio data including a combination of the pseudo shutter sound data 27c and the recorded audio data is reproduced during the blackout image time period of the first substitute frame among the time period during which the moving image recording is interrupted to capture a still image. In the stop motion image time period of the second substitute frame, a frame corresponding to the still image that has been actually captured during the still image capturing operation is reproduced, and also the audio data recorded during the stop motion image time period of the second substitute frame is reproduced.

In step S320, as described above, the CPU 26 returns to step S212 (FIG. 2) and prepares for resuming the moving image capturing operation. More specifically, in step S212, the CPU 26 switches the mode of the image sensor 10 to read the moving image, switches the setting for the signal processing unit 16, the resizing unit 24, and the image codec unit 18 to the setting for processing the moving image, and switches the data path. In step S214, the CPU 26 returns to step S200 to start a moving image capturing operation again to consecutively perform capturing of a moving image to be recorded.

Figure 4:
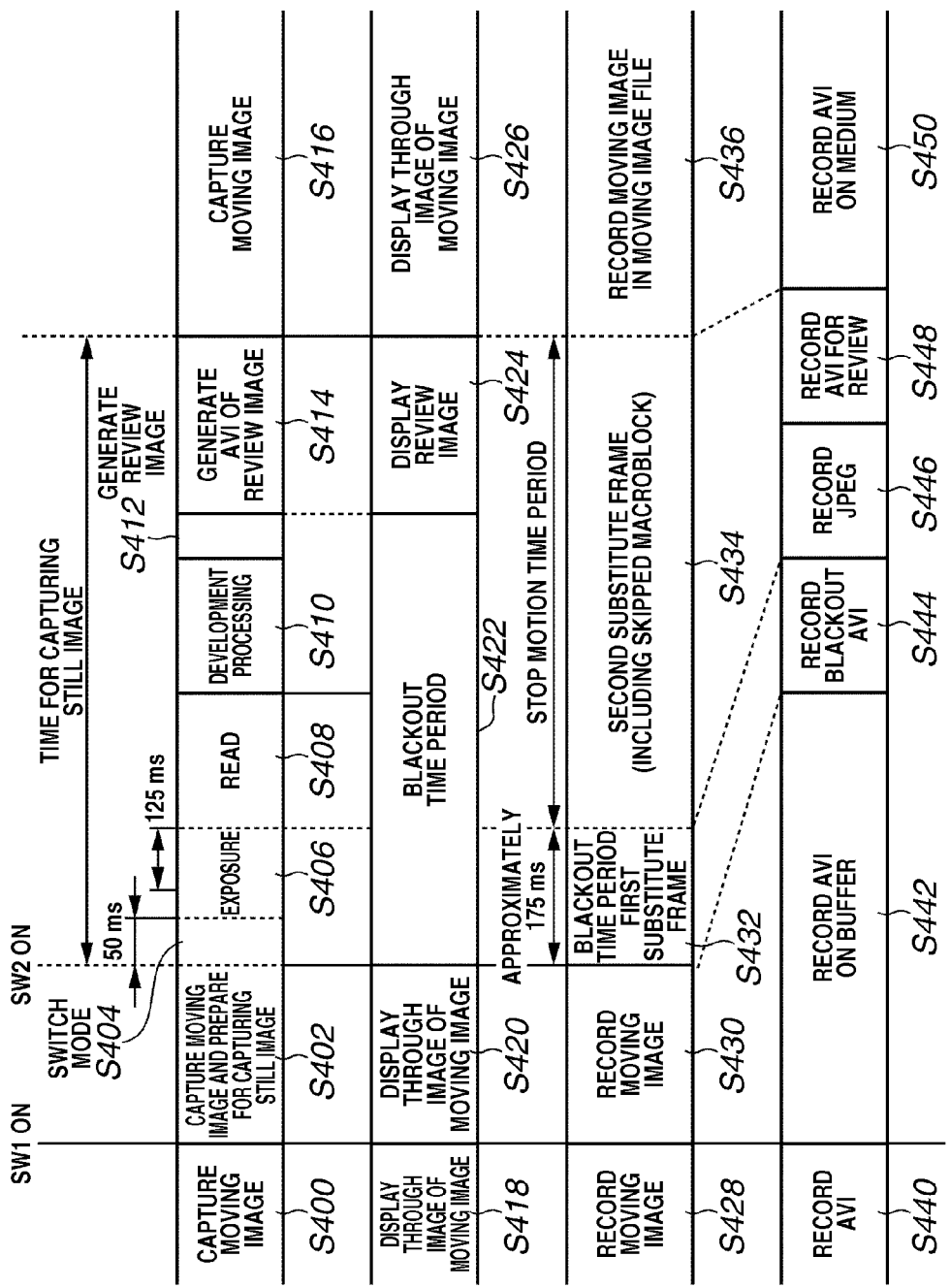
FIGS. 4A through 4D illustrate a sequence performed when a still image capturing operation is performed during a moving image recording operation according to an exemplary embodiment of the present invention.

FIGS. 4A through 4D illustrate a sequence of capturing a still image performed during recording of a moving image. More specifically, FIG. 4A illustrates a sequence of shifting the operation state of the digital camera 100 during the image capturing operation. FIG. 4B illustrates a sequence of changing a through image displayed on the display unit 22 during the image capturing operation. FIG. 4C illustrates a state of recording the generated moving image file (AVI file) corresponding to the sequence of the image capturing operation and image recording operation. That is, FIG. 4C illustrates a sequence of changing an image displayed on the LCD of the digital camera 100 or a monitor of a television set when the moving image file (AVI file) is reproduced. FIG. 4D illustrates an assumed timing for writing the generated AVI file on the recording medium 21.

As will be described in more detail later below, the processing for recording image data on the recording medium 21 among the moving image capturing operation and the still image capturing operation does not match the timing in FIG. 4A. Here, in each of FIGS. 4A through 4D, the time period from the leftmost portion thereof to the timing at which the switch SW1 of the release switch 23a is ON indicates that the moving image capturing operation is being performed.

Referring to FIG. 4A, a time period S400 corresponds to the time period in which the moving image capturing operation is being performed. While the moving image is being captured during the time period S400, in a time period S418 (FIG. 4B), the CPU 26 displays a through image of the captured moving image on the display unit 22, and in a time period S428 (FIG. 4C), the CPU 26 records the moving image and the audio data as a moving image file.

In a time period S402 (FIG. 4A) from a time point when the switch SW1 is turned ON to a time period when the switch SW2 is turned ON, the CPU 26 performs the still image capturing preparation processing (AF processing and AE processing) while capturing the moving image and recording the captured moving image.

In a time period S420 (FIG. 4B), the CPU 26 displays on the display unit 22 a moving image captured during the sequence of the AE processing and the AF processing performed in the still image capturing preparation operation. In a time period S430 (FIG. 4C), the CPU 26 records as the moving image file a moving image captured during the sequence of the AE processing and the AF processing performed in the still image capturing preparation operation.

Here, in the time period before the switch SW2 is turned ON, the timings in FIGS. 4A, 4B, and 4C mutually match. However, after the switch SW2 is turned ON, the timings in FIGS. 4A, 4B, and 4C do not mutually match. Now, a sequence performed after the switch SW2 is turned ON is described below.

In a time period S404 (FIG. 4A), the mode of the image sensor 10 is changed immediately after the switch SW2 is turned ON. More specifically, the mode of the image sensor 10 is changed from a moving image reading mode to a still image exposure mode. A subsequent time period S406 (FIG. 4A) is a time period for exposure for a still image. In the present exemplary embodiment, with respect to the time period of exposure, the CPU 26 controls the exposure of an object image variably in a range from ½,000 second to ⅛ second.

In a time period S408 (FIG. 4A), the CPU 26 reads all of the pixels of the still image from the image sensor 10 in a plurality of fields. This reading processing requires a time of about 300 msec.

In a time period S410 (FIG. 4A), the CPU 26 performs development processing on the still image. The development processing includes reading of RAW data from the DRAM 14 and writing of JPEG-coded data on the DRAM 14.

In a time period S412 (FIG. 4A), the CPU 26 generates a review image. Here, the CPU 26 resizes the YUV data having the above-described content and transferred from the signal processing unit 16 to the VGA size with the resizing unit 24. Further, the CPU 26 writes the resized image on the DRAM 14 as a review image.

During the time periods from S404 through S412, which correspond to a time period S422 (a blackout time period in FIG. 4B), the CPU 26 displays the blackout image (solid image) on the display unit 22.

The blackout image is displayed to clearly notify the user that the digital camera 100 is currently capturing a still image and performing the development processing on the captured still image. More specifically, in the time periods from S404 through S412, the CPU 26 displays a solid image different than an EVF through image. That is, the image displayed here is the same as that in a normal still image capturing operation.

In a time period S414 (FIG. 4A), the CPU 26 generates data for the second substitute frame to be inserted into the moving image file based on the review image generated in the time period S412. In the time period S414, the CPU 26 compresses the VGA-sized YUV data into MPEG data with the image codec unit 18. Further, the CPU 26 inserts the SMB images as the substitute frames for missing moving image frames and generates a moving image file including the audio data obtained at that time.

In a time period S424 (FIG. 4B), which corresponds to the time period S414 (FIG. 4A), the CPU 26 displays the review image on the display unit 22.

In a time period S432 (FIG. 4C), the CPU 26 interpolates, with the blackout image and the SMB image (solid images), the time periods from S404 (the time period for changing the mode of the image sensor 10) to S406 (the exposure period) in capturing a still image during recording of the moving image file.

The exposure time can be varied based on the luminance level of the object. In the present exemplary embodiment, the blackout time period S432 is set to a maximum exposure time (that is, 50+80=130 msec). The CPU 26 inserts the pseudo shutter sound data during the time period S432.

In a time period S434 (FIG. 4C), the CPU 26 inserts the substitute frame data and the SMB image, which are generated based on the review image generated in the time period S412, in substitution for missing moving image frames. The time period S434 is a moving image file stop motion time period. The time period S434 starts immediately after the blackout (first substitute frame) time period and ends before returning to the moving image capturing operation.

The CPU 26 performs the following sequence after capturing the still image. In a time period S416 (FIG. 4A), the CPU 26 resumes the moving image capturing operation. In a time period S426 (FIG. 4B), the CPU 26 displays a through image of the moving image again on the display unit 22. In a time period S436 (FIG. 4C), the CPU 26 records the moving image in the moving image file.

Generally, the actual operation of the shutter during the still image capturing operation involves opening of the closed shutter. In order to display the still image capturing operation on the moving image file, it is necessary to perform the operation in the order such as "a moving image →closing of the shutter→display a still image stop motion image→close the shutter→open the shutter→a moving image".

However, during the moving image capturing operation, it is more useful in recording the moving image to return to the moving image capturing operation immediately after the user has recognized the still image stop motion image. Accordingly, the sequence of "a moving image→close the Shutter→display a still image stop motion image→a moving image" is most useful, instead of performing the shutter closing/opening operation after displaying the still image stop motion image.

With respect to the closing of the shutter, although the blackout image is inserted as the substitute frame and the SMB image, it is useful that the stop motion image is displayed for a predetermined fixed length of time.

Furthermore, in the time period for displaying the stop motion image, the user confirms the captured image. However, if the stop motion image is displayed for an excessively long period of time, the moving image capturing operation can be hindered. Accordingly, it is useful to display the stop motion image for a second predetermined length of time. Here, considering the smooth operation of the digital camera 100, it is useful that the second predetermined time length is set to the length of the time period for processing a still image (the time period before resuming capturing of the moving image).

That is, during the time period in which the moving image capturing operation is interrupted, the frames of the blackout image other than the substitute frame are replaced with the still image stop motion images.

In the present exemplary embodiment, for the above-described reasons, the still image captured during the moving image recording operation is displayed as the stop motion image for a time period of about 600 msec.

Now, processing for recording an image on the recording medium 21 is described with reference to FIG. 4D. In the present exemplary embodiment, a moving image AVI file has a data structure in which audio data and video data are disposed every other second. The CPU 26 generates a moving image file based on the AVI data in an AVI buffer area of the DRAM 14 and writes the generated moving image file to generate an AVI file on the recording medium 21.

In a time period S440 (FIG. 4D), the CPU 26 writes on the recording medium 21 the AVI data generated in the moving image capturing operation. A time period S442 (FIG. 4D) is a time period for recording the moving image after a timing at which the switch SW1 is turned ON. Just as in the time period S440, the CPU 26 continues recording the moving image AVI file also in the time period S442. The time period S442 does not end at the timing at which the switch SW2 is turned ON, namely, at the timing at which the reading of the moving image from the image sensor 10 and the generation of the moving image AVI data are interrupted.

This is because, at this timing, the AVI data still remains in the AVI buffer area of the DRAM 14, and thus the CPU 26 continues writing on the recording medium 21 the AVI data remaining in the AVI buffer area.

At the timing at which the data in the AVI buffer area is completely written on the recording medium 21, the sequence advances from the time period S442 to a time period S444 (FIG. 4D). In the time period S444 (FIG. 4D), the CPU 26 writes the blackout image data and the SMB image data, which correspond to the blackout time period (time period S432), on the recording medium 21.

The AVI data for displaying the blackout image is generated immediately after the switch SW2 is turned ON. Accordingly, the CPU 26 can write the AVI data for displaying the blackout image immediately after completely writing the AVI data remaining in the AVI buffer area.

Furthermore, if the speed of writing the data on the recording medium 21 is high enough to write the AVI data at substantially the same time as generating the AVI file, then no data remains in the AVI buffer area. Accordingly, the CPU 26 can write the AVI data including the blackout image data and the SMB image data in the time period S444 immediately after the switch SW2 is turned ON.

The size of AVI data in which the blackout image data and the SMB image data are inserted is small. Accordingly, the CPU 26 can write the AVI data in a relatively short period of time. Here, the speed of writing data can differ for each type of medium used as the recording medium 21.

If the writing speed is high, no data to be written on the recording medium 21 remains during a time period after writing the AVI data including the blackout image data and the SMB image data on the recording medium 21 in the time period S444 until the next time period S446. That is, the CPU 26 does not perform writing of data during this period.

In a time period S446 (FIG. 4D), the CPU 26 writes on the recording medium 21 a file of JPEG data obtained by JPEG-coding the still image captured during the still image capturing operation (i.e., the still image file including all of the pixels obtained as a result of the development processing performed according to the recording mode). The JPEG-coded still image data has been generated in the time period S410. Accordingly, the JPEG data is written on the recording medium 21 after the time period S410. Immediately after writing the JPEG-coded still image data on the recording medium 21 in the time period S446 (namely, in a time period S448 (FIG. 4D), the CPU 26 writes on the recording medium 21 the AVI data generated based on the review image that has been generated after the still image capturing operation.

In the time period S448 for recording the review image AVI data, the CPU 26 records the image equivalent to the second substitute frame time period (the time period S434). After completely writing the review image AVI data in the time period S448, the AVI data of the moving image that has been generated in the time period S416 accumulates in the AVI buffer area of the DRAM 14. Accordingly, the CPU 26 writes the accumulated moving image AVI data on the recording medium 21 at the timing of a time period S450.

According to the above-described sequence, the CPU 26 writes the data on the recording medium 21 in the case of capturing a still image during the moving image recording operation. By reproducing the thus recorded AVI data according to the above-described sequences, the user can easily recognize the operation status of capturing the still image during the moving image recording operation.

If the release switch 23a is half-pressed, namely, if the switch SW1 is ON and the switch SW2 is OFF, the digital camera 100 can display an icon indicating the release switch 23a in a corner portion of the screen displaying the moving image currently captured. In this case, it can be notified to the user that a still image capturing operation is about to start, immediately before the blackout image is displayed due to the start of the still image capturing operation during the moving image reproduction operation.

Now, a configuration of the moving image file in the case where a still image is captured during the moving image recording operation is described below with reference to FIG.

5. As described above, a moving image file has a data structure in which audio data equivalent to one second exists at the head portion thereof and moving image frames exist after the audio data.

In the present exemplary embodiment, the CPU 26 generates the first I frame of a GOP for each fifteen frames. When the switch SW2 of the release switch 23a is turned ON during a moving image capturing operation, the moving image capturing operation is interrupted. Then, the image codec unit 18 outputs a blackout image P frame. Then, the CPU 26 inserts one blackout image P frame into the AVI file, and then the CPU 26 insets three SMB images into the AVI file (the blackout time period).

When the image codec unit 18 has completed the development processing during the still image capturing operation, the image codec unit 18 generates a stop motion image P frame based on the review image and inserts the thus generated stop motion image P frame into the AVI file.

Then, the CPU 26 continues inserting the SMB images during the stop motion time period. With respect to the first frame of the GOP during the stop motion time period, the image codec unit 18 generates a stop motion image I frame based on the review image, and the CPU 26 inserts the thus generated stop motion image I frame into the AVI file.

When the stop motion time period has ended and thus the moving image capturing operation has resumed, the CPU 26 returns to a normal moving image capturing operation and serially records the moving image frames and audio data in the AVI file.

As described above, the present exemplary embodiment replaces a redundant frame of a moving image file, which is generated by capturing a still image during a moving image capturing operation, with an SMB image. With this file structure, the size of a moving image file can be reduced. Furthermore, the load of writing data on a storage medium can be reduced.

Second Exemplary Embodiment

Now, a second exemplary embodiment of the present invention is described below. A digital camera in the present exemplary embodiment is similar to the digital camera 100 in FIG. 1 described in the first exemplary embodiment. The processing performed in the case of capturing a still image during a moving image capturing operation is similar to that performed according to the flow chart of FIG. 2 in the first exemplary embodiment.

Figure 6:
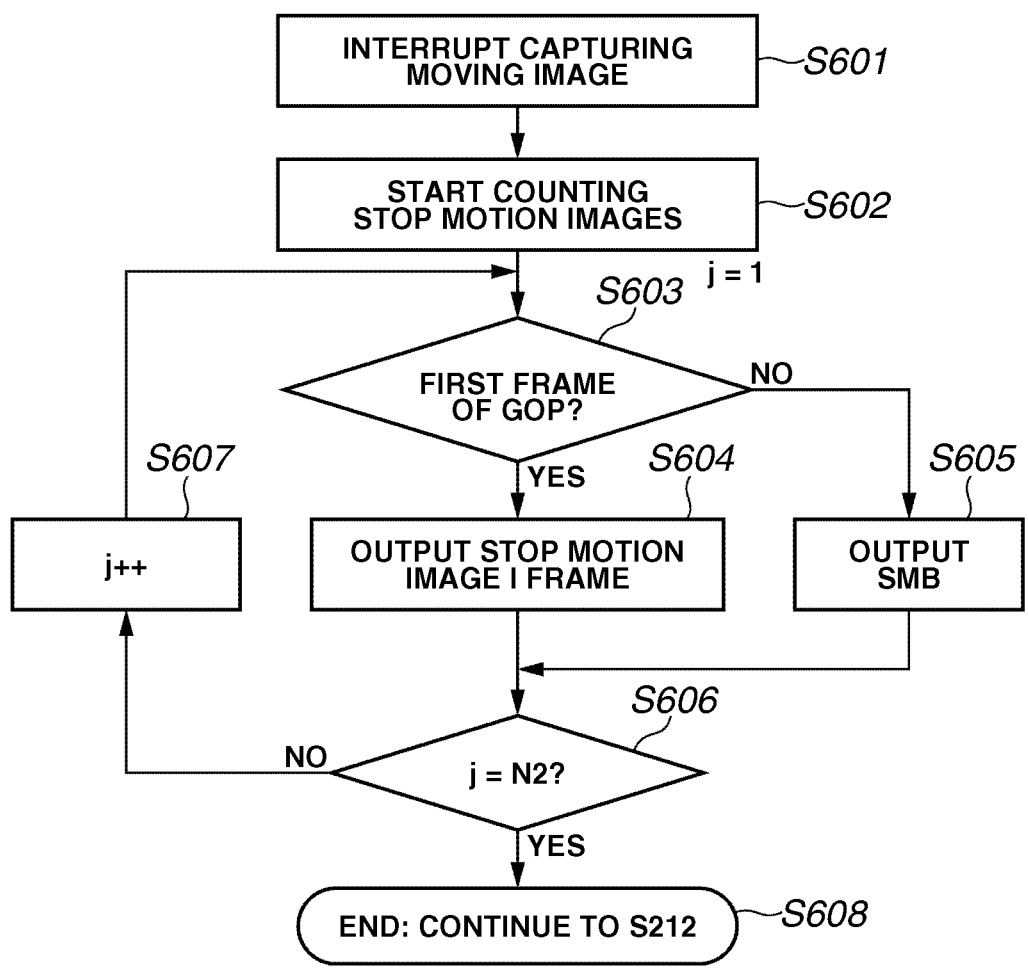
FIG. 6 is a flow chart illustrating an example of processing for generating a moving image file in the case where a still image capturing operation is performed according to a second exemplary embodiment of the present invention.

FIG. 6 is a flow chart illustrating an example of processing for generating a moving image file in the case of performing a still image capturing operation in step S210 (FIG. 2) according to the present exemplary embodiment.

Referring to FIG. 6, in step S601, the CPU 26 interrupts the moving image capturing operation. In step S602, the CPU 26 starts counting the number N2 of stop motion images (a counting initial value j=1).

In step S603, the CPU 26 determines whether the substitute frame is the first frame of a GOP. If it is determined in step S603 that the substitute frame is the first frame of the GOP (YES in step S603), then the processing advances to step S604. In step S604, the CPU 26 encodes image data of a frame captured immediately before the start of the still image capturing operation into a stop motion image I frame of VGA size and then outputs the stop motion image I frame.

On the other hand, if it is determined in step S603 that the substitute frame is not the first frame of the GOP (NO in step S603), then the processing advances to step S605. In step S605, the CPU 26 outputs an SMB image 27b of VGA size from the ROM 27.

In step S606, the CPU 26 determines whether the value j has reached the number N2. If it is determined in step S606 that the value j has not reached the number N2 (NO in step S606), then the processing advances to step S607. In step S607, the CPU 26 increments the value j and then returns to step S603. On the other hand, if it is determined in step S606 that the value j has reached the number N2 (YES in step S606), then the processing advances to step S608. In step S608, the CPU 26 ends the processing and advances to step S212.

The coded image of VGA size (stop motion image I frame) is substitute frame data. The substitute frame can be generated based on a review image or an image captured immediately before the interruption of the moving image capturing operation. Furthermore, the substitute frame can be an arbitrary image.

Figure 7:
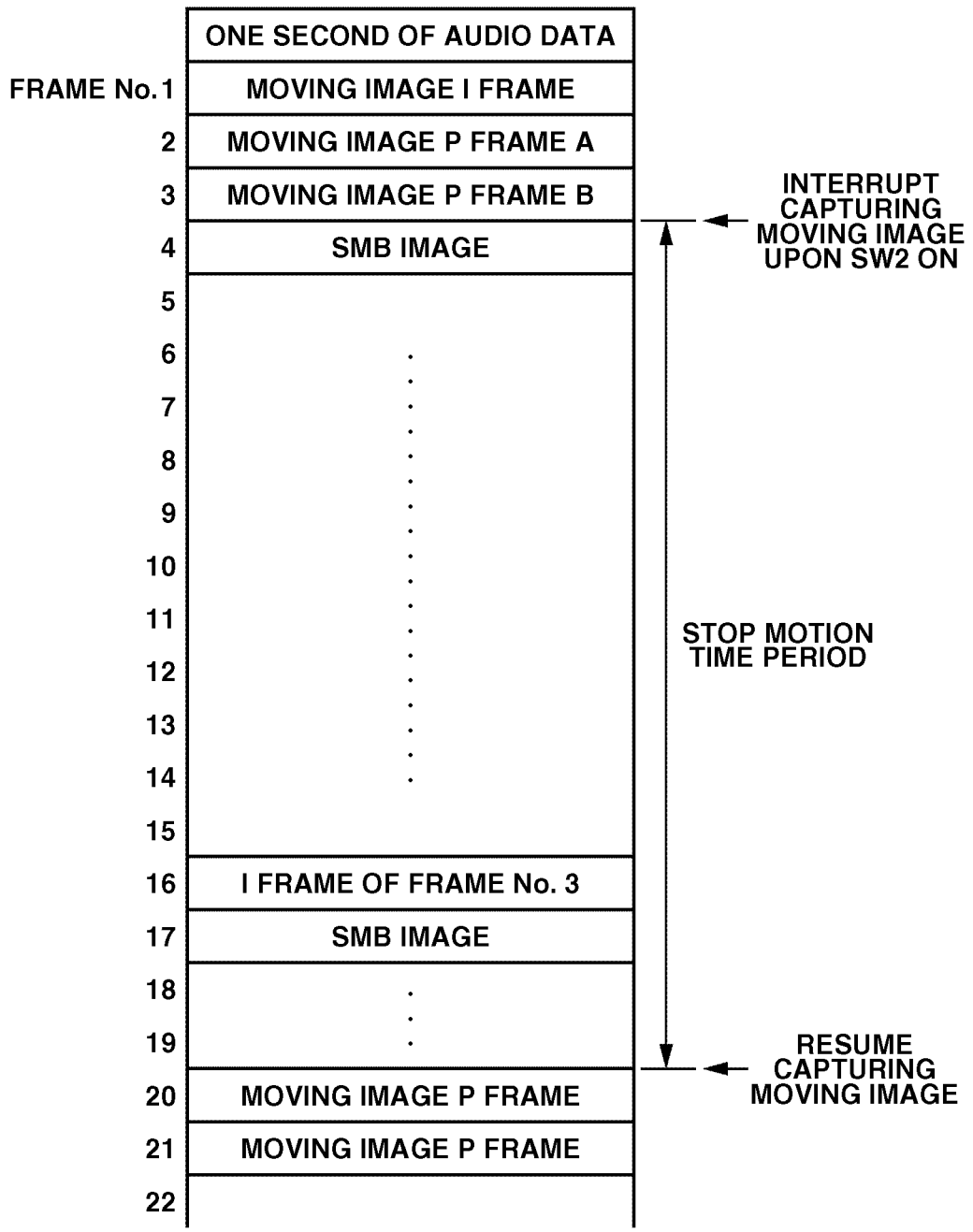
FIG. 7 illustrates an example of a data structure of a moving image file in the case where a still image capturing operation is performed during a moving image recording operation according to the second exemplary embodiment of the present invention.

FIG. 7 illustrates an example of a configuration of a moving image file in the case of capturing a still image during a moving image capturing operation according to the present exemplary embodiment. In the present exemplary embodiment, a moving image file has a data structure in which audio data equivalent to one second exists at the head portion thereof and moving image frames exist after the audio data.

Referring to FIG. 7, the moving image capturing operation is interrupted when the switch SW2 is turned ON (frame No. 4), and SMB images for skipping the previous frame (frame No. 3) are stored in the moving image file during a time period equivalent to the stop motion time period.

The first frame of a GOP, which exists during the stop motion time period, is a frame No. 16. Here, one GOP includes fifteen frames. The CPU 26 generates, for the frame No. 16, an I frame with the image codec unit 18 based on a frame generated immediately before the interruption of the moving image capturing operation (frame No. 3).

When the stop motion time period ends, the CPU 26 resumes the moving image capturing normal operation from a frame No. 20 and generates moving image frames with the image codec unit 18. During the stop motion time period, the CPU 26 can record audio data or insert pseudo shutter sound data.

As described above, the present exemplary embodiment replaces a redundant frame of a moving image file, which is generated by capturing a still image during a moving image capturing operation, with an SMB image. With this file structure, the size of a moving image file can be reduced. Furthermore, the load of writing data on a storage medium can be reduced.

Moreover, the present exemplary embodiment inserts an I frame for each GOP during the stop motion time period. Accordingly, the user can edit an image file based on a fixed editing unit, which enables the user to easily perform editing of an image file. In the present exemplary embodiment, an I frame and a P frame are used. However, an interlaced image can be used instead of the I frame or the P frame. In the present exemplary embodiment, the moving image data is MPEG-coded data. However, the present invention is not limited to this. That is, moving image data can be H.264 (MPEG-4 Part-10: AVC (ISO/IEC 14496-10 "Part-10 Advanced Video Coding"))-coded data.

Third Exemplary Embodiment

Now, a third exemplary embodiment of the present invention is described below. A digital camera in the present exemplary embodiment is similar to the digital camera 100 in FIG. 1 described in the first exemplary embodiment. The processing performed in the case of capturing a still image during a moving image capturing operation is similar to that performed according to the flow chart of FIG. 2 in the first exemplary embodiment.

Figure 8:
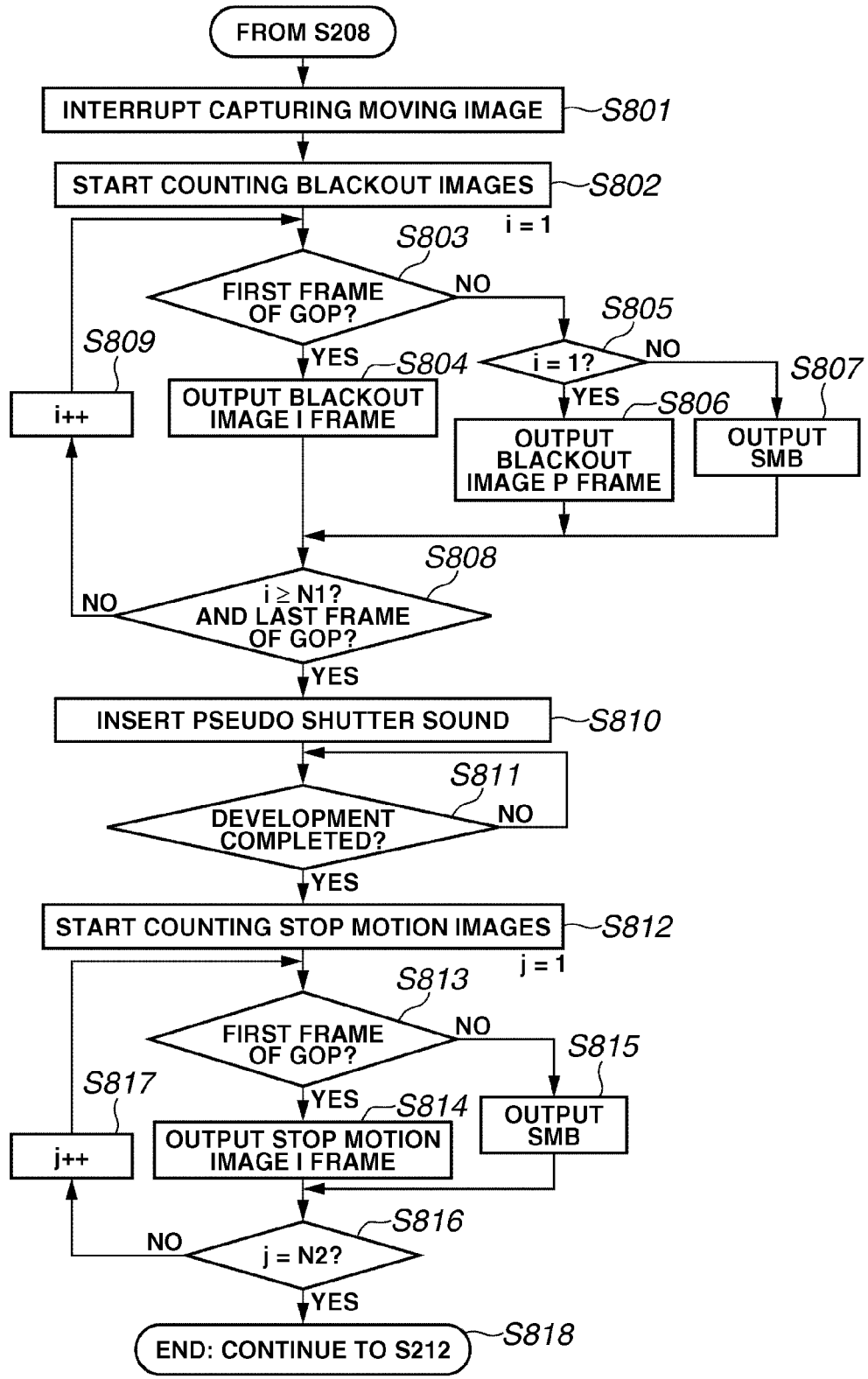
FIG. 8 is a flow chart illustrating an example of processing for generating a moving image file in the case where a still image capturing operation is performed according to a third exemplary embodiment of the present invention.

FIG. 8 is a flow chart illustrating an example of processing for generating a moving image file in the case of performing a still image capturing operation in step S210 (FIG. 2) according to the present exemplary embodiment.

A flow of processing for generating a moving image file is described below with reference to FIG. 8. The processing in FIG. 8 is performed substantially in parallel with the still image capturing operation. Processing in step S801 starts if it is determined in step S208 that the switch SW2 is turned ON (YES in step S208).

In step S801, the CPU 26 interrupts the moving image capturing operation. In step S802, the CPU 26 starts counting the number N1 of stop motion images (a counting initial value i=1). Here, the number N1 is previously set corresponding to the period for which the moving image capturing operation is interrupted to capture a still image.

In step S803, the CPU 26 determines whether the substitute frame is the first frame of a GOP to insert a blackout image and an SMB image as a first substitute frame into the moving image frame.

If it is determined in step S803 that the substitute frame is the first frame of the GOP (YES in step S803), then the processing advances to step S804. In step S804, the CPU 26 encodes image data of a frame captured immediately before the start of the still image capturing operation into a blackout image I frame and then outputs the blackout image I frame.

On the other hand, if it is determined in step S803 that the substitute frame is not the first frame of the GOP (NO in step S803), then the processing advances to step S805. In step S805, the CPU 26 determines whether the value i=1. If it is determined in step S805 that the value i=1 (YES in step S805), then the processing advances to step S806. In step S806, the CPU 26 outputs a blackout image P frame that has been encoded with the image codec unit 18.

If it is determined in step S803 that that the substitute frame is not the first frame of the GOP (NO in step S803) and it is determined in step S805 that i≠1 (NO in step S805), then the processing advances to step S807. In step S807, the CPU 26 outputs an SMB image. The blackout image I frame and the blackout image P frame can be previously generated by the CPU 26.

The SMB image 27b is read from ROM 27 and is then inserted into the moving image file (AVI data) as a first substitute frame.

If a stop motion image is an I frame, because a blackout image is not necessary as a reference frame in this case, the CPU 26 does not generates a blackout image with the image codec unit 18.

Figure 9:
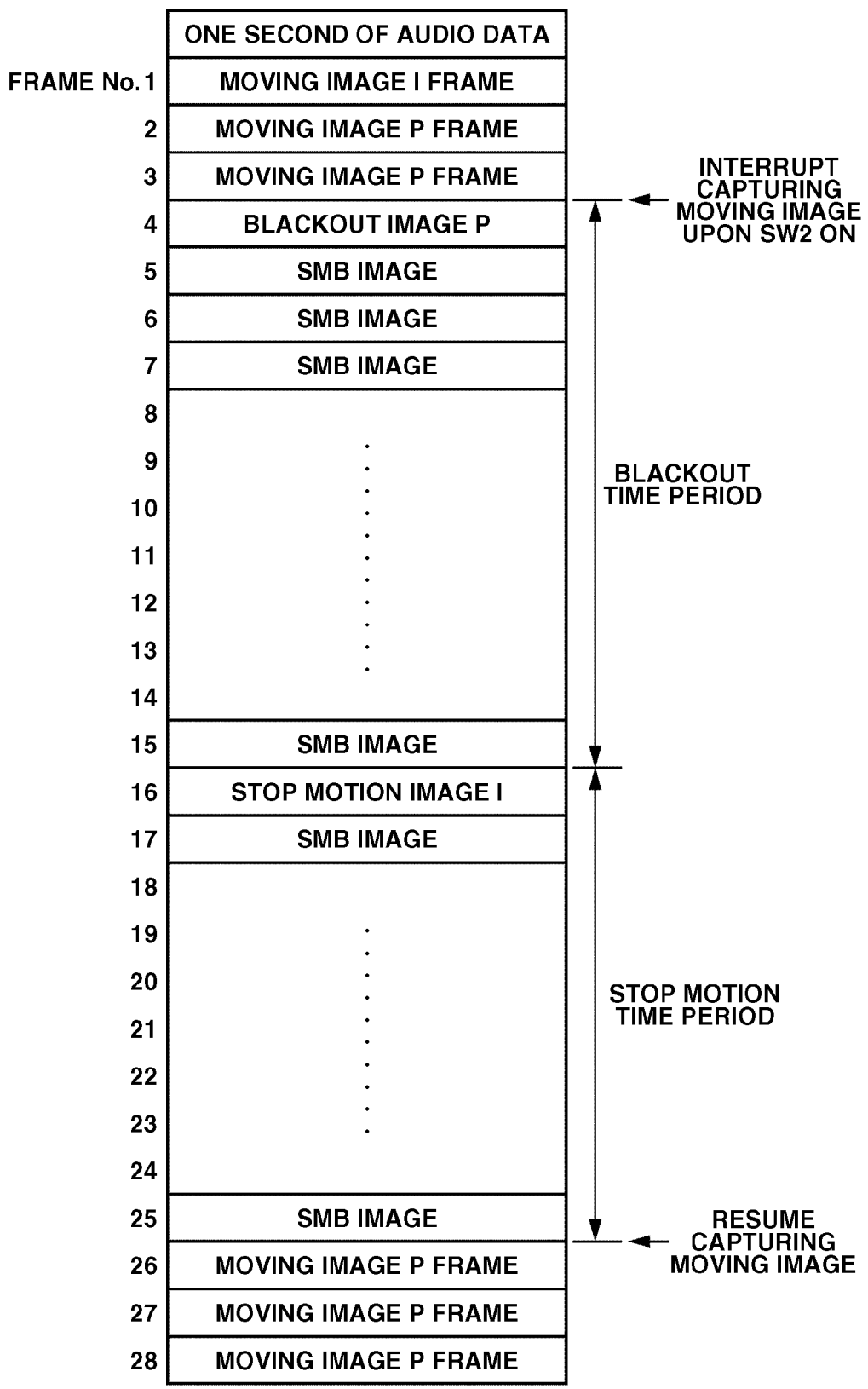
FIG. 9 illustrates an example of a data structure of a moving image file in the case where a still image capturing operation is performed during a moving image recording operation according to the third exemplary embodiment of the present invention.

FIG. 9 illustrates an example of a configuration of a moving image file recorded while capturing a still image during the recording of the moving image according to the present exemplary embodiment.

Referring to FIG. 9, in generating a moving image P frame for a frame No. 26, which is necessary in resuming the moving image capturing operation, it is necessary to acquire and use information about a frame No. 16. SMB images are inserted as frames No. 17 through No. 25.

If the stop motion image is an I frame (frame No. 16), because a blackout image is not necessary as a reference frame in this case, the CPU 26 does not generate a blackout image with the image codec unit 18. Furthermore, in this case, the CPU 26 reads an MPEG-coded blackout image 27a (FIG. 1) from the ROM 27 and inserts the read blackout image 27a into the moving image file (AVI data) as the first substitute frame. Here, the present exemplary embodiment is not limited to this. That is, the CPU 26 can generate the blackout image 27a instead of reading the MPEG-coded blackout image 27a from the ROM 27.

In step S808, the CPU 26 determines whether the number of blackout images has reached the number N1 and the substitute frame is the last frame of the GOP. If it is determined in step S808 that the number of blackout images has not reached the number N1 or the substitute frame is not the last frame of the GOP (NO in step S808), then the processing advances to step S809. In step S809, the CPU 26 increments the value i and then returns to step S803. On the other hand, if it is determined in step S808 that the number of blackout images has reached the number N1 and the substitute frame is the last frame of the GOP (YES in step S808), then the processing advances to step S810.

In step S810, the CPU 26 reads pseudo shutter sound data 27c (FIG. 1) from the ROM 27 and inserts the read pseudo shutter sound data 27c into the moving image file (AVI file) as audio data. In addition, in step S810, the CPU 26 outputs the pseudo shutter sound data 27c to the audio processing unit 28 to reproduce the pseudo shutter sound data 27c with the speaker 32. The time length of the pseudo shutter sound data 27c is set at substantially the same time length of the above-described blackout image data.

At this time, if the audio data recorded via the microphone 30 is suddenly replaced with the pseudo shutter sound data 27c, the sudden replacement of the audio data may lead to generate a high-frequency component and noise data may be generated due to aliasing.

In this regard, in the time period for replacing the audio data with the pseudo shutter sound data 27c (i.e., in the time period for reproducing the pseudo shutter sound data 27c with the speaker 32), the audio processing unit 28 does not detect audio information (mutes the audio data to be reproduced). More specifically, the CPU 26 inserts the pseudo shutter sound data 27c as the muted audio data. Thus, high-quality pseudo shutter sound data 27c can be inserted into the audio data without generating a high-frequency noise, which may be generated due to aliasing.

In step S811, the CPU 26 waits until the still image development processing in the above-described still image capturing operation is completed. When the still image development processing is completed, the processing advances to step S812.

After the still image development processing is completed, the CPU 26 JPEG-encodes the developed still image with the image codec unit 18 as processing in step S210 (FIG. 2), and generates one still image file based on the JPEG-coded data. The still image file thus generated is stored on the recording medium 21 separately from the moving image file.

In parallel with the above-described processing or after the above-described processing is completed, in step S812, the CPU 26 generates a review image of VGA size with the resizing unit 24 based on the developed still image. Then, the CPU 26 starts counting a number N2 of stop motion images. Here, an initial counting value j is 1.

In step S813, the CPU 26 determines whether the substitute image (stop motion image) is the first frame of the GOP. If it is determined in step S813 that the substitute image is the first frame of the GOP (YES in step S813), then the CPU 26 encodes the review image data with the image codec unit 18 as a stop motion image I frame and then advances to step S814. In step S814, the CPU 26 outputs the stop motion image I frame.

On the other hand, if it is determined in step S813 that the substitute image is not the first frame of the GOP (NO in step S813), then the processing advances to step S815. In step S815, the CPU 26 outputs the SMB image.

In step S816, the CPU 26 determines whether the value j has reached the number N2 of stop motion images. If it is determined in step S816 that the value j has not reached the number N2 of stop motion images (NO in step S816), then the processing advances to step S817. In step S817, the CPU 26 increments the value j and then returns to step S813. On the other hand, if it is determined in step S816 that the value j has reached the number N2 of stop motion images (YES in step S816), then the processing advances to step S818. In step S818, the CPU 26 ends the processing and advances to step S212 (FIG. 2).

As described above, the present exemplary embodiment replaces a redundant frame of a moving image file, which is generated by capturing a still image during a moving image capturing operation, as an SMB image. With this file structure, the size of a moving image file can be reduced. Furthermore, the load of writing data on a storage medium can be reduced.

Moreover, the present exemplary embodiment inserts an I frame for each GOP during the stop motion time period. Accordingly, the user can edit an image file based on a fixed editing unit, which enables the user to easily perform editing of an image file. In addition, in the present exemplary embodiment, the CPU 26 generates a blackout image for each GOP. Thus, with respect to the stop motion image, it is not necessary for the CPU 26 to generate a P frame because only an I frame, which does not use the blackout image as the reference frame is required. With this configuration, the present exemplary embodiment can reduce the load on the image codec unit 18.

The number of GOPs is not limited to one and one or more GOPs can be used. In the present exemplary embodiment, an I frame and a P frame are used. However, an interlaced image can be used instead of the I frame or the P frame.

In the present exemplary embodiment, the moving image data is MPEG-coded data. However, the present invention is not limited to this. That is, moving image data can be H.264-coded data, as long as the moving image file can be inter-frame-coded.

Moreover, the stop motion image in the second time period can be generated for each GOP, just as in the case of the first time period. With this configuration, the rate control can be easily performed to resume the recording of a moving image starting with an I frame, even when the degree of correlation between the stop motion image and a moving image captured after resuming the once-interrupted moving image capturing operation is low.

Fourth Exemplary Embodiment

Now, a fourth exemplary embodiment of the present invention is described below. A digital camera in the present exemplary embodiment is similar to the digital camera 100 in FIG. 1 described in the first exemplary embodiment. The processing performed in the case of capturing a still image during a moving image capturing operation is similar to that performed according to the flow chart of FIG. 2 in the first exemplary embodiment.

Figure 10:
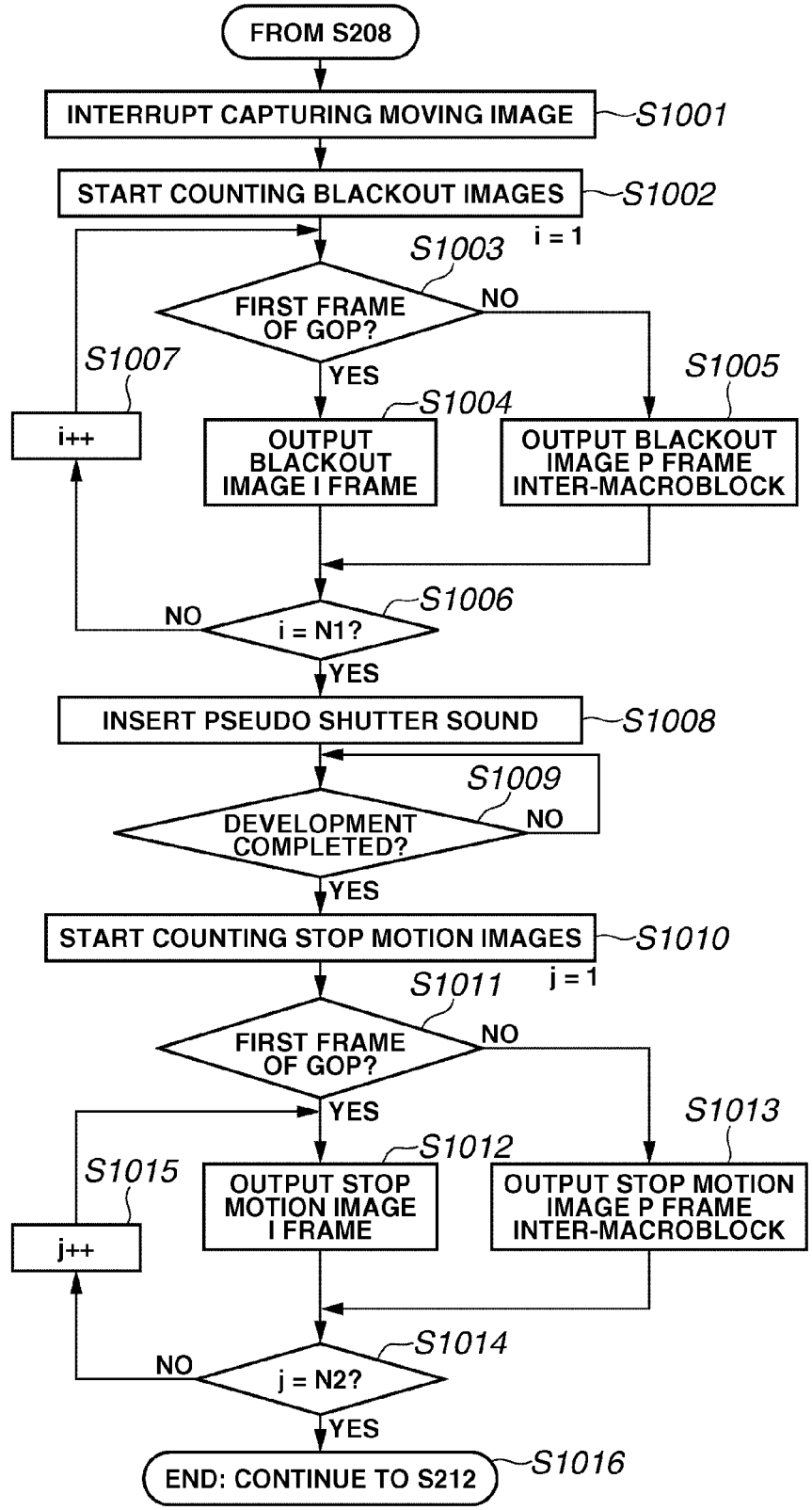
FIG. 10 is a flow chart illustrating an example of processing for generating a moving image file in the case where a still image capturing operation is performed according to a fourth exemplary embodiment of the present invention.

FIG. 10 is a flow chart illustrating an example of processing for generating a moving image file in the case of performing a still image capturing operation in step S210 (FIG. 2) according to the present exemplary embodiment.

A flow of processing for generating a moving image file is described below with reference to FIG. 10. The processing in FIG. 10 is performed substantially in parallel with the still image capturing operation. Processing in step S1001 starts if it is determined in step S208 that the switch SW2 is turned ON (YES in step S208).

In step S1001, the CPU 26 interrupts the moving image capturing operation. In step S1002, the CPU 26 starts counting a number N1 of stop motion images (a counting initial value i=1). Here, the number N1 is previously set for the period during which the moving image capturing operation is interrupted to capture a still image.

In step S1003, the CPU 26 determines whether the substitute frame is the first frame of a GOP to insert a blackout image as a first substitute frame in the moving image frame.

If it is determined in step S1003 that the substitute frame is the first frame of the GOP (YES in step S1003), then the processing advances to step S1004. In step S1004, the CPU 26 encodes image data of a frame captured immediately before the start of the still image capturing operation into a blackout image I frame, and then outputs the blackout image I frame.

On the other hand, if it is determined in step S1003 that the substitute frame is not the first frame of the GOP (NO in step S1003), then the processing advances to step S1005. In step S1005, the CPU 26 outputs an inter-macroblock (inter MB) for a blackout image P frame that has been encoded with the image codec unit 18. Here, an "inter MB" is an interframe-compressed P frame of an image, in which all of the macroblocks in P frames are used as intra-macroblocks, on which no predictive coding based on another frame is performed.

In the P frame, generally, difference information between frames is recorded. And the difference between a current frame and previous frame is calculated in unit of the macroblock and the calculation result is defined as the inter MB. Here, in case the difference information is 0, the inter-macroblock is changed to the skipped macroblock as described in the previous embodiment.

But, in the process of this embodiment, each macroblock of P flames, which is encoded in advance, is defined as a macroblock which does not refer to a forward frame, in other words, as an intra-macroblock which is calculated in one frame. Because this inter-macroblock does not refer to a forward frame, the blackout image P frame is able to be reserved in advance.

The blackout image I frame and the blackout image P frame can be previously generated by the CPU 26.

The blackout image is read from the ROM 27 and is then inserted in the moving image file (AVI data) as a first substitute frame.

FIG. 11 illustrates an example of a configuration of a moving image file recorded while capturing a still image during the recording of the moving image according to the present exemplary embodiment.

Referring to FIG. 11, frames No. 1 through No. 3 are images captured before interrupting the moving image capturing operation. Frames No. 4 through No. 7, which are blackout images inserted after the interruption of the moving image capturing operation, are each constituted by a P frame inter MB.

For the frame No.4, the image codec unit 18 generates a blackout image P frame inter MB.

The length (time period) of the first substitute frame is equivalent to a maximum exposure time in a camera green mode (AUTO mode) and is about ⅛ second (125 msec). In the case of capturing a moving image at a speed of 30 frames/sec, the number of frames in ⅛ second is four.

Accordingly, the CPU 26 inserts four blackout images 27a (that has been read from the ROM 27) (or four blackout images generated with the image codec unit 18) in the AVI file. Here, the CPU 26 can insert an image including a message, such as "capturing a still image . . . ", instead of the blackout image.

In step S1006, the CPU 26 determines whether the number of blackout images has reached the number N1. If it is determined in step S1006 that the number of blackout images has not reached the number N1 (NO in step S1006), then the processing advances to step S1007. In step S1007, the CPU 26 increments the value i and then returns to step S1003. On the other hand, if it is determined in step S1006 that the number of blackout images has reached the number N1 (YES in step S1006), then the processing advances to step S1008.

In step S1008, the CPU 26 reads pseudo shutter sound data 27c (FIG. 1) from the ROM 27 and inserts the read pseudo shutter sound data 27c in the moving image file (AVI file) as audio data. In addition, in step S1008, the CPU 26 outputs the pseudo shutter sound data 27c to the audio processing unit 28 to reproduce the pseudo shutter sound data 27c with the speaker 32. The time length of the pseudo shutter sound data 27c is set at substantially the same time length of the above-described blackout image data.

At this time, if the audio data recorded via the microphone 30 is suddenly replaced with the pseudo shutter sound data 27c, the sudden replacement of the audio data may lead to generate a high-frequency component and noise data may be generated due to aliasing. In this regard, in the time period for replacing the audio data with the pseudo shutter sound data 27c (i.e., in the time period for reproducing the pseudo shutter sound data 27c with the speaker 32), the audio processing unit 28 does not detect audio information (mutes the audio data to be reproduced). More specifically, the CPU 26 inserts the pseudo shutter sound data 27c as the muted audio data. Thus, high-quality pseudo shutter sound data 27c can be inserted in the audio data without generating a high-frequency noise, which may be generated due to aliasing.

In step S1009, the CPU 26 waits until the still image development processing in the above-described still image capturing operation is completed. When the still image development processing is completed, the processing advances to step S1010.

After the still image development processing is completed, the CPU 26 JPEG-encodes the developed still image with the image codec unit 18 as processing in step S210 (FIG. 2), and generates one still image file based on the JPEG-coded data. The still image file thus generated is stored on the recording medium 21 separately from the moving image file.

In parallel with the above-described processing or after the above-described processing is completed, in step S1010, the CPU 26 generates a review image of VGA size with the resizing unit 24 based on the developed still image. Then, the CPU 26 starts counting a number N2 of stop motion images. Here, an initial counting value j is 1.

In step S1011, the CPU 26 determines whether the substitute image (stop motion image) is the first frame of the GOP. If it is determined in step S1011 that the substitute image is the first frame of the GOP (YES in step S1011), then the CPU 26 encodes the review image data with the image codec unit 18 as a stop motion image I frame and then advances to step S1012. In step S1012, the CPU 26 outputs the stop motion image I frame.

On the other hand, if it is determined in step S1011 that the substitute image is not the first frame of the GOP (NO in step S1011), then the processing advances to step S1013. In step S1013, the CPU 26 encodes the review image data with the image codec unit 18 as a stop motion image P frame inter MB and outputs the stop motion image P frame inter MB.

In step S1014, the CPU 26 determines whether the value j has reached the number N2 of stop motion images. If it is determined in step S1014 that the value j has not reached the number N2 of stop motion images (NO in step S1014), then the processing advances to step S1015. In step S1015, the CPU 26 increments the value j and then returns to step S1011. On the other hand, if it is determined in step S1014 that the value j has reached the number N2 of stop motion images (YES in step S1014), then the processing advances to step S1016. In step S1016, the CPU 26 ends the processing and advances to step S212 (FIG. 2).

As described above, the present exemplary embodiment replaces a redundant P frame of a moving image file, which is generated by capturing a still image during a moving image capturing operation, with an SMB image. With this file structure, the load on the image codec unit 18 can be reduced because no reference image is necessary.

In the present exemplary embodiment, an I frame and a P frame are used. However, an interlaced image can be used instead of the I frame or the P frame. In the present exemplary embodiment, the moving image data is MPEG-coded data. However, the present invention is not limited to this. That is, moving image data can be H.264-coded data, as long as the moving image file can be interframe-coded.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-121743 filed May 2, 2007 and No. 2008-053415 filed Mar. 4, 2008, which are hereby incorporated by reference herein in its entirety.

What is claimed is:

1. An imaging apparatus configured to record image data captured by an imaging unit on a recording medium, the imaging apparatus comprising:

a moving image capturing control unit configured to control a moving image capturing operation for recording on the recording medium a moving image obtained by a continuous image capturing operation by the imaging unit; and a still image capturing control unit configured to control a still image capturing operation for recording on the recording medium a still image obtained by an image capturing operation by the imaging unit as a still image file, wherein, in response to an input instruction to start the still image capturing operation when the moving image capturing operation is being performed, the still image capturing control unit controls the still image capturing operation to record the still image file on the recording medium, and the moving image capturing control unit interrupts the moving image capturing operation, generates a moving image in which a skipped macroblock image is inserted as at least one of images to be substituted for a moving image corresponding to a time period for which the moving image capturing operation is interrupted by starting the still image capturing operation, and records the generated moving image on the recording medium, wherein the moving image capturing control unit inserts, into the moving image, a blackout image and the interframe-compressed image whose difference information is zero during a first time period including a time period for which the still image capturing operation is performed, and inserts, into the moving image, a stop motion image equivalent to the still image obtained by the still image capturing operation and the interframe-compressed image whose difference information is zero during a second time period following the first time period in the time period for which the still image capturing operation is performed, wherein the first time period is ended at last frame of current group of pictures (GOP) and the second period is started at first frame of next GOP, and wherein the stop motion image is used as an intra-coded frame (I frame) at the first frame of next GOP.

2. The imaging apparatus according to claim 1, wherein the time period for which the moving image capturing operation is interrupted includes at least a time period from a time point when image data for a still image is read out of the imaging unit to a time point when development processing is completed during the still image capturing operation.

3. The imaging apparatus according to claim 1, further comprising:
a display unit configured to display a captured image; and
a review image generation unit configured to generate a review image to be displayed by the display unit based on image data obtained by the still image capturing operation after capturing the still image,
wherein the stop motion image is generated from the review image.

4. The imaging apparatus according to claim 1, further comprising an audio input unit configured to input audio information,
wherein the moving image capturing operation includes an operation for recording the moving image on the recording medium together with the audio information input by the audio input unit.

5. The imaging apparatus according to claim 4, wherein the moving image capturing control unit records audio information of pseudo shutter sound during the first time period and records the audio information input by the audio input unit during the second time period.

6. The imaging apparatus according to claim 5, wherein the moving image capturing control unit stops the audio input unit from inputting any audio information during a time period for which the audio information of pseudo shutter sound is recorded in the first time period.

7. The imaging apparatus according to claim 1, wherein the moving image capturing control unit resizes still image data obtained by the still image capturing operation to an image of a size adapted to be recorded as a moving image during the second time period and records the resized image data.

8. The imaging apparatus according to claim 1, wherein the first time period has a fixed length of time.

9. The imaging apparatus according to claim 1, wherein the first time period includes at least an exposure time period for which a shutter is opened in the still image capturing operation by the imaging unit.

10. The imaging apparatus according to claim 1, wherein the second time period includes at least a time period from a time point when image data for a still image is read out of the imaging unit to a time point when development processing is completed during the still image capturing operation.

11. The imaging apparatus according to claim 1, wherein the interframe-compressed image inserted during the first time period includes an inter-macroblock image on which no predictive coding based on another frame is performed.

12. The imaging apparatus according to claim 11, wherein the interframe-compressed image inserted during the second time period includes the inter-macroblock image.

13. A method for controlling an imaging apparatus having a function for performing a moving image capturing operation for recording on a recording medium a moving image obtained by a continuous image capturing operations by an imaging unit and a still image capturing operation for recording on the recording medium a still image obtained by an image capturing operation by the imaging unit as a still image file, the method comprising:
interrupting the moving image capturing operation in response to an input instruction to start the still image capturing operation when the moving image capturing operation is being performed;
controlling the still image capturing operation to record the still image file on the recording medium;
generating a moving image in which a skipped macroblock image is inserted as at least one of images to be substituted for a moving image corresponding to a time period for which the moving image capturing operation is interrupted by starting the still image capturing operation; and
recording the generated moving image on the recording medium,
wherein the moving image capturing control unit inserts, into the moving image, a blackout image and the interframe-compressed image whose difference information is zero during a first time period including a time period for which the still image capturing operation is performed, and inserts, into the moving image, a stop motion image equivalent to the still image obtained by the still image capturing operation and the interframe-compressed image whose difference information is zero during a second time period following the first time period in the time period for which the still image capturing operation is performed,
wherein the first time period is ended at last frame of current group of pictures (GOP) and the second period is started at first frame of next GOP,
wherein the stop motion image is used as an intra-coded frame (I frame) at the first frame of next GOP.

* * * * *